(12) United States Patent
Tamura et al.

(10) Patent No.: US 8,886,519 B2
(45) Date of Patent: Nov. 11, 2014

(54) TEXT PROCESSING APPARATUS, TEXT PROCESSING METHOD, AND COMPUTER-READABLE RECORDING MEDIUM

(75) Inventors: Akihiro Tamura, Tokyo (JP); Kai Ishikawa, Tokyo (JP); Shinichi Ando, Tokyo (JP)

(73) Assignee: NEC Corporation, Tokyo (JP)

( * ) Notice: Subject to any disclaimer, the term of this patent is extended or adjusted under 35 U.S.C. 154(b) by 718 days.

(21) Appl. No.: 13/142,302

(22) PCT Filed: Dec. 21, 2009

(86) PCT No.: PCT/JP2009/007071
§ 371 (c)(1),
(2), (4) Date: Jul. 12, 2011

(87) PCT Pub. No.: WO2010/073591
PCT Pub. Date: Jul. 1, 2010

(65) Prior Publication Data
US 2011/0282653 A1    Nov. 17, 2011

(30) Foreign Application Priority Data
Dec. 26, 2008    (JP) .................................. 2008-335327

(51) Int. Cl.
*G06F 17/27* (2006.01)
*G06F 17/28* (2006.01)
(52) U.S. Cl.
CPC ........ *G06F 17/2827* (2013.01); *G06F 17/2775* (2013.01)
USPC ...... 704/9; 704/1; 704/10; 704/235; 704/257; 704/277; 707/706; 707/707; 707/708; 715/256

(58) Field of Classification Search
CPC .............. G06F 17/27; G06F 17/2705; G06F 17/30719; G06F 17/30864
USPC ........................... 704/1, 9, 10, 235, 257, 277; 707/706–708; 715/256
See application file for complete search history.

(56) References Cited

U.S. PATENT DOCUMENTS 5,708,825 A * 1/1998 Sotomayor ................... 715/205
6,108,620 A * 8/2000 Richardson et al. .............. 704/9
(Continued)

FOREIGN PATENT DOCUMENTS

| JP | 11-025112 A | 1/1999 |
| JP | 2002215619 A | 8/2002 |

(Continued)

OTHER PUBLICATIONS

International Search Report for PCT/JP2009/007071 mailed Mar. 30, 2010.

(Continued)

*Primary Examiner* — Lamont Spooner
(74) *Attorney, Agent, or Firm* — Sughrue Mion, PLLC

(57) ABSTRACT

A text processing apparatus is provided with a segment determination unit 36 and a descriptive content determination unit 33. The segment determination unit 36 determines, with respect to a homogeneous segment that is similar to segments constituting a first text which is set as an analysis target (analysis target text) and that is included in another first text, whether the content thereof is included in a second text. The descriptive content determination unit 33 determines whether each segment constituting the analysis target text should be described in a corresponding second text, based on the determination result.

36 Claims, 25 Drawing Sheets

(56) References Cited

U.S. PATENT DOCUMENTS

| | | | |
|---|---|---|---|
| 6,185,592 B1* | 2/2001 | Boguraev et al. | 715/256 |
| 6,205,456 B1* | 3/2001 | Nakao | 715/201 |
| 6,275,797 B1* | 8/2001 | Randic | 704/233 |
| 6,317,708 B1* | 11/2001 | Witbrock et al. | 704/9 |
| 6,493,663 B1* | 12/2002 | Ueda | 704/9 |
| 6,993,527 B1* | 1/2006 | Raman et al. | 715/237 |
| 7,120,586 B2* | 10/2006 | Loui et al. | 704/275 |
| 7,386,439 B1* | 6/2008 | Charnock et al. | 704/9 |
| 7,509,572 B1* | 3/2009 | Melander et al. | 715/234 |
| 7,756,827 B1* | 7/2010 | Yung et al. | 707/634 |
| 7,822,750 B2* | 10/2010 | Duchon et al. | 707/738 |
| 8,032,827 B2* | 10/2011 | Melander et al. | 715/234 |
| 8,345,159 B2* | 1/2013 | Polumbus et al. | 348/468 |
| 2002/0052730 A1* | 5/2002 | Nakao | 704/10 |
| 2003/0115060 A1* | 6/2003 | Junqua et al. | 704/235 |
| 2003/0120477 A1* | 6/2003 | Kruk et al. | 704/2 |
| 2004/0034668 A1* | 2/2004 | Gotz et al. | 707/201 |
| 2004/0059736 A1* | 3/2004 | Willse et al. | 707/100 |
| 2004/0128143 A1* | 7/2004 | Kahn et al. | 704/277 |
| 2006/0167689 A1* | 7/2006 | Maren | 704/240 |
| 2007/0192093 A1* | 8/2007 | Eskenazi | 704/231 |
| 2008/0126396 A1* | 5/2008 | Gagnon | 707/102 |
| 2008/0252780 A1* | 10/2008 | Polumbus a/k/a Tad Polumbus et al. | 348/468 |
| 2008/0306973 A1* | 12/2008 | Richard | 707/100 |
| 2010/0005087 A1* | 1/2010 | Basco et al. | 707/5 |
| 2013/0066852 A1* | 3/2013 | Rose | 707/722 |
| 2013/0124532 A1* | 5/2013 | McQuarrie | 707/748 |

FOREIGN PATENT DOCUMENTS

| | | |
|---|---|---|
| JP | 2004253011 A | 9/2004 |
| JP | 2008287638 A | 11/2008 |
| WO | 2008/078670 A1 | 7/2008 |

OTHER PUBLICATIONS

R. Barzilay et al., "Sentence Alignment for Monolingual Comparable Corpora", in Proceedings of the 2003 Conference on Empirical Methods in Natural Language Processing, 2003, pp. 25-32.

S. Roy et al., "Automatic Generation of Domain Models for Call-Centers from Noisy Transcriptions", Proceedings of the 21st International Conference on Computational Linguistics and the 44th annual meeting of the Association for Computational Linguistics, 2006, pp. 737-744.

A. Tamura et al., "Using Differential Text Mining to Analyze Speech Dialogues and Call-memos in a Call Center", FIT2008, 2008.

M. A. Hearst, "TextTiling: Segmenting Text into Multi-paragraph Subtopic Passages", Computational Linguistics, vol. 23, No. 1, 1997, pp. 33-64.

* cited by examiner

FIG. 10

- Receipt ID=15280

| Segment ID | Speaker | Recognition result |
|---|---|---|
| 15280-1 | Operator | I'm sorry to have kept you waiting, you have reached ABC Call Center. |
| ... | ... | ... |
| 15280-30 | Customer | The printer has been making a rattling noise recently. |
| 15280-31 | Customer | Then, yesterday it wouldn't print anymore. |
| 15280-32 | Operator | I see. |
| 15280-33 | Operator | Is there an error message displayed? |
| 15280-34 | Customer | It says "XXX error." |
| 15280-35 | Operator | It could be that you have a paper jam. |
| 15280-36 | Operator | We'll fix the problem, so if I could please get your name... |
| ... | ... | ... |

- Receipt ID =15281

| Segment ID | Speaker | Recognition result |
|---|---|---|
| 15281-1 | Operator | Hello, you have reached ABC Call Center. |
| ... | ... | ... |
| 15281-15 | Customer | The paper jams when I try to print. |
| 15281-16 | Operator | Where does the problem seem to be? |
| 15281-17 | Customer | It's where the paper comes out. |
| 15281-18 | Operator | Is there an error message displayed? |
| 15281-19 | Customer | What it says is "XXX error." |
| 15281-20 | Operator | Okay, we'll make arrangements to get the problem fixed. |
| ... | ... | ... |

FIG. 11

| Receipt ID | Customer | Segment ID | Content of inquiry |
|---|---|---|---|
| ... | ... | | ... |
| 15280 | Hanako Sato | 15280-1 | Yesterday, printer paper jam. |
| | | 15280-2 | Abnormal noise when printing. |
| 15281 | Taro Yamada | 15281-1 | Paper jamming at printer paper outlet. |
| | | 15281-2 | "XXX error" display. |
| ... | ... | | ... |

FIG. 12

15280-1
I'm sorry to have kept you waiting, you have reached ABC Call Center.

| I | Noun |
|---|---|
| am | Verb |
| sorry | Adjective |
| to | Preposition |
| have | Verb |
| kept | Verb |
| you | Noun |
| have | Verb |
| reached | Verb |
| ABC | Noun |
| Call | Noun |
| Center | Noun |
| . | Symbol |

15280-33
Is there an error message displayed?

| is | Verb |
|---|---|
| there | Adverb |
| an | Article |
| error | Noun |
| message | Noun |
| displayed | Verb |
| ? | Symbol |

15281-1
Hello, you have reached ABC Call Center.

| hello | Interjection |
|---|---|
| , | Symbol |
| you | Noun |
| have | Verb |
| reached | Verb |
| ABC | Noun |
| Call | Noun |
| Center | Noun |
| . | Symbol |

FIG. 13

Word vectors

| 15280-1 | (1, 1, 1, 1, 1, 0, 0, 0, 0) |
|---|---|
| 15280-33 | (0, 0, 0, 0, 0, 1, 1, 1, 1) |
| 15281-1 | (0, 0, 1, 1, 1, 0, 0, 0, 0) |

Dimension-Word Allocation Table

| Dimension | Morpheme | |
|---|---|---|
| 1 | Sorry | Adjective |
| 2 | kept | Verb |
| 3 | ABC | Noun |
| 4 | Call | Noun |
| 5 | Center | Noun |
| 6 | There | Adverb |
| 7 | Error | Noun |
| 8 | Message | Noun |
| 9 | displayed | Verb |

FIG. 14

| Cluster ID | Segments |
|---|---|
| 1 | ⋯, 15278-3, 15280-1, 15281-1, 15282-1, ⋯ |
| ⋯ | ⋯ |
| 5 | ⋯, 15280-35, 15281-15, 15330-24, 16000-12, ⋯ |
| 7 | ⋯, 14300-14, 15280-34, 15281-19, ⋯ |
| ⋯ | ⋯ |

FIG. 15

Phone Call Speech Recognition Results (15280-35)

| could | Auxiliary |
|-------|-----------|
| paper | Noun |
| jam | Noun |

Customer memos (15280-1)

| Yesterday | Adverb |
|-----------|--------|
| printer | Noun |
| paper | Noun |
| jam | Verb |

FIG. 16

| Words in phone call speech | Words in customer memo | Mutual information |
|---|---|---|
| ... | ... | ... |
| could | Yesterday | 0.0004 |
| could | printer | 0.0001 |
| could | paper | 0.0002 |
| could | jam | 0.0002 |
| paper | Yesterday | 0.0005 |
| paper | printer | 0.0646 |
| paper | paper | 0.3862 |
| paper | jam | 0.0781 |
| ... | ... | ... |

FIG. 17

| Segment ID | 15280-1 | ... | 15280-31 | ... | 15280-33 | 15280-34 |
|---|---|---|---|---|---|---|
| Same content description | × | ... | ○ | ... | × | × |
| Segment ID | 15280-35 | ... | 15281-15 | ... | 15281-19 | ... |
| Same content description | ○ | ... | ○ | ... | ○ | ... |

○: described
×: not described

FIG. 18

| Segment ID | Text portion | Degree of association |
|---|---|---|
| ... | ... | ... |
| 15280-31 | Then, yesterday it wouldn't print anymore. | 1.39 |
| 15280-33 | Is there an error message displayed? | 0.56 |
| 15280-34 | It says "XXX error." | 0.89 |
| 15280-35 | It could be that you have a paper jam. | 2.25 |
| ... | ... | ... |

FIG. 19

- Receipt ID=15280

| Speaker | Recognition result |
|---|---|
| Operator | I'm sorry to have kept you waiting, you have reached ABC Call Center. |
| ... | ... |
| Customer | The printer has been making a rattling noise recently. Then, yesterday it wouldn't print anymore. |
| Operator | I see. Is there an error message displayed? |
| Customer | It says "XXX error." |
| Operator | It could be that you have a paper jam. We'll fix the problem, so if I could please get your name··· |
| ... | ... |

- Receipt ID =15281

| Speaker | Recognition result |
|---|---|
| Operator | Hello, you have reached ABC Call Center. |
| ... | ... |
| Customer | The paper jams when I try to print. |
| Operator | Where does the problem seem to be? |
| Customer | It's where the paper comes out. |
| Operator | Is there an error message displayed? |
| Customer | What it says is "XXX error." |
| Operator | Okay, we'll make arrangements to get the problem fixed. |
| ... | ... |

FIG. 20

| Receipt ID | Customer | Content of inquiry |
|---|---|---|
| ... | ... | ... |
| 15280 | Hanako Sato | Yesterday, printer paper jam. Abnormal noise when printing. |
| 15281 | Taro Yamada | Paper jamming at printer paper outlet. "XXX error" display. |
| ... | ... | ... |

FIG. 21

- Receipt ID=15280

| Segment ID | Recognition result |
|---|---|
| 15280-1 | I'm sorry to have kept you waiting, you have reached ABC Call Center. |
| ... | ... |
| 15280-2 | The printer has been making a rattling noise recently. Then, yesterday it wouldn't print anymore. |
| 15280-3 | I see. Is there an error message displayed? It says "XXX error." It could be that you have a paper jam. |
| 15280-4 | We'll fix the problem, so if I could please get your name··· |
| ... | ... |

FIG. 22

- Receipt ID=15280

| Segment ID | Recognition result |
|---|---|
| 15280-1 | I'm sorry to have kept you waiting, you have reached ABC Call Center. |
| ... | ... |
| 15280-2 | The printer has been making a rattling noise recently. Then, yesterday it wouldn't print anymore. I see. Is there an error message displayed? It says "XXX error." It could be that you have a paper jam. |
| 15280-3 | We'll fix the problem, so if I could please get your name... |
| ... | ... |

FIG. 23

| Segment ID | Homogeneous segment |
|---|---|
| 15280-1 | None |
| ... | ... |
| 15280-34 | ..., 14300-14, 15281-19, ... |
| 15280-35 | ..., 15281-15, 15330-24, 16000-12, ... |
| ... | ... |

FIG. 24

|  | ... | 15280-32 | 15280-33 | 15280-34 | 15280-35 | ... |
|---|---|---|---|---|---|---|
| ... | ... | ... | ... | ... | ... | ... |
| 15281-17 | ... | 0.021 | 0.160 | 0.155 | 0.340 | ... |
| 15281-18 | ... | 0.004 | 1.000 | 0.682 | 0.235 | ... |
| 15281-19 | ... | 0.011 | 0.832 | 0.920 | 0.333 | ... |
| ... | ... | ... | ... | ... | ... | ... |

FIG. 25

| Segment ID | 15280-1 | ... | 15280-34 | 15280-35 | ... |
|---|---|---|---|---|---|
| Same content description | 0.023 | ... | 0.452 | 0.688 | ... |
| Segment ID | 15281-15 | ... | 15281-19 | ... | 16000-12 |
| Same content description | 0.785 | ... | 0.833 | ... | 0.218 |

TEXT PROCESSING APPARATUS, TEXT PROCESSING METHOD, AND COMPUTER-READABLE RECORDING MEDIUM

This application is the National Phase of PCT/JP2009/007071, filed Dec. 21, 2009, which is based upon and claims the benefit of priority of the prior Japanese Patent Application No. 2008-335327, filed on Dec. 26, 2008, the entire contents of which are incorporated herein by reference.

TECHNICAL FIELD

The present invention relates to a text processing apparatus, a text processing method and a computer-readable recording medium for performing text analysis, when a first text and a second text are provided that target the same event but are generated through mutually different generation processes.

BACKGROUND ART

There are cases where two types of text that target the same event are generated by different generation processes. Assume that one type of text is a first text, and that a set of a plurality of first texts is a first text set. Assume also that the other type of text is a second text, and that a set of a plurality of second texts is a second text set. In the case where there are two such types of text, it is useful to specify, within each first text constituting the first text set, portions in which is described content that should be described in a corresponding second text.

For example, in a call center, speech recognition is performed on phone call speech, and a plurality of texts are obtained as a result. Consider the case where the obtained texts are first texts and the set of first texts is a first text set. In many call centers, the operator derives the gist of the phone call and prepares a customer memo constituted by text. Accordingly, at many call centers, there are sets of customer memos corresponding to first texts in the first text set. Because these customer memos are generated by a different generation process to the first texts, while targeting the same event as the first texts, these customer memos can be viewed as second texts, and a set of customer memos can be viewed as a second text set.

Under such circumstances at a call center, it is important to specify, within each speech recognition text, portions forming the gist of the phone call that should be written in a corresponding customer memo. Being able to specify portions, within each speech recognition text, forming the gist of a phone call that should be written in a corresponding customer memo enables an analyst to examine only the important portion, by highlighting that portion, for example, and an improvement in analysis efficiency is achieved. This also subsequently enables processing such as text mining and searches focused on the portion forming the gist, and, further, the preparation of summaries utilizing the gist of each speech recognition text.

Alternatively, in the case where, for example, a set of research papers is considered to be a first text set, there may be presentation material corresponding to each research paper in the set. In this case, the set of presentation material can be viewed as a second text set. It is then important to specify, from within each research paper (first text set), important portions that should be written as presentation material.

Being able to specify, from within each research paper, portions that should be written as presentation material enables readers to view the material efficiently, by highlighting those portions, for example. This case is also able to facilitate subsequent processing such as text mining, searches and summary preparation, similarly to the case mentioned earlier where a text set obtained by performing speech recognition on phone call speech is viewed as the first text set.

Also, consider the case where summary documents are prepared by two different people respectively summarizing a given document set. In this case, the set of summary documents summarized by one person can be viewed as a first text set, and the set of summary documents summarized by the other person can be viewed as a second text set.

Even under circumstances where two different people respectively prepare summaries, it is important to specify, from within each first text constituting the first text set, portions that should be written in a corresponding second text. Being able to perform such specification enables portions that are considered important by both people to be determined by examining the specified portions, and also enables analysis focused on the determined portions. It also becomes possible to analyze differences between the summaries of both people by examining portions other than the determined portions.

As for the technique of specifying portions in one text that are described in another text, assuming two texts as inputs, a technique of aligning texts is known. With an alignment technique, one text is viewed as a string of segments constituting a block of homogeneous information. Then, with this alignment technique, it is determined whether a segment corresponding to the content of a segment in one text does or does not appear in any of the segments in the other text.

For example, Patent Document 1 and Non-patent Document 1 disclose specific examples of alignment techniques. Patent Document 1 discloses an alignment technique that efficiently uses a diversity of lexical information and knowledge information as a key to alignment. With the alignment technique disclosed in Patent Document 1, original language is aligned with a translation thereof.

With the alignment technique disclosed in Non-patent Document 1, the topics of paragraphs to which sentences belong is firstly determined, and macro-alignment between paragraphs utilizing the topics is executed, as a preliminary step to alignment in sentences that is ultimately to be executed. Alignment in sentence units is executed on pairs of aligned paragraphs. With the alignment technique disclosed in Non-patent Document 1, the unabridged version of an encyclopedia is aligned with the abridged version.

Therefore, assuming that a first text and a second text corresponding thereto are the inputs of the alignment technique disclosed in Patent Document 1 or Non-patent Document 1, portions (segments) described in the second text are specified from within the first text.

CITATION LIST

Patent Document

Patent Document 1: JP 2002-215619A

Non-Patent Document

Non-patent Document 1: R. Barzilay and N. Elhadad, "Sentence Alignment for Monolingual Comparable Corpora," in Proceedings of the Conference on Empirical Methods in Natural Language Processing (EMNLP, 2003), pp. 25-32, 2003.

DISCLOSURE OF THE INVENTION

Problem to be Solved by the Invention

Incidentally, there are existing texts in which information that should originally be written as the content of the text is partially absent due, for instance, to an oversight by the person who prepared the text. For example, there are customer memos in a call center that do not include information that should originally be kept as a customer memo, due to an operator having forgotten to write it down or making an error of judgment.

However, with the alignment techniques disclosed in Patent Document 1 and Non-patent Document 1, alignment is performed using only the two input texts, that is, the pair of the first text and the second text corresponding thereto as a key. Segments in the first text that are written in the second text are specified using this key.

Thus, the following problem arises when using the above-mentioned alignment techniques in the case where there is a second text in which information that should be written as the second text is absent. In other words, in this case, a problem arises in that segments of a first text that would be determined as portions that should originally be written in the second text set will be not be correctly determined as portions that should be written due to the absent information in the corresponding second text.

An object of the present invention is to solve the above problems and to provide a text processing apparatus, a text processing method and a computer-readable recording medium that make it possible to specify, from a text targeted for analysis, a portion that should be described in another text corresponding to the text targeted for analysis, even when some information is absent in the other text.

Means for Solving the Problem

In order to attain the above object, a text processing apparatus of the present invention performs an analysis process by contrasting a first text set constituted by first texts and a second text set constituted by second texts corresponding to the first texts, the first texts and the second texts corresponding thereto being generated around a same event through mutually different generation processes, the text processing apparatus including a segment determination unit, and a descriptive content determination unit, the segment determination unit determining, with respect to a homogeneous segment that is similar to a plurality of segments constituting a first text which is set as an analysis target and that is included in another first text, whether a content thereof is included in the second texts, and the descriptive content determination unit determining, based on a result of the determination by the segment determination unit, whether each segment constituting the first text which is set as the analysis target should be described in the second text corresponding to the first text which is set as the analysis target.

In order to attain the above object, a text processing method of the present invention involves performing an analysis process by contrasting a first text set constituted by first texts and a second text set constituted by second texts corresponding to the first texts, the first texts and the second texts corresponding thereto being generated around a same event through mutually different generation processes, the text processing method including the steps of (a) determining, with respect to a homogeneous segment that is similar to a plurality of segments constituting a first text which is set as an analysis target and that is included in another first text, whether a content thereof is included in the second texts, and (b) determining, based on a result of the determination in the (a) step, whether each segment constituting the first text which is set as the analysis target should be described in the second text corresponding to the first text which is set as the analysis target.

In order to attain the above object, a computer-readable recording medium of the present invention has recorded thereon a program for causing a computer to execute an analysis process of contrasting a first text set constituted by first texts and a second text set constituted by second texts corresponding to the first texts, the first texts and the second texts corresponding thereto being generated around a same event through mutually different generation processes, the program recorded on the recording medium includes a command for causing the computer to execute the steps of (a) determining, with respect to a homogeneous segment that is similar to a plurality of segments constituting a first text which is set as an analysis target and that is included in another first text, whether a content thereof is included in the second texts, and (b) determining, based on a result of the determination in the (a) step, whether each segment constituting the first text which is set as the analysis target should be described in the second text corresponding to the first text which is set as the analysis target.

Effects of the Invention

As a result of the above features, the present invention is able to specify, from a text targeted for analysis, a portion that should be described in another text corresponding to the text targeted for analysis, even when some information is absent in the other text.

BRIEF DESCRIPTION OF DRAWINGS

FIG. 10 is a diagram showing an example of speech recognition texts used in Working Example 1.

FIG. 11 is a diagram showing an example of a customer memo set used in Working Example 1.

FIG. 12 is a diagram showing an example of analysis results of morphological analysis performed when determining a homogeneous segment.

FIG. 13 is a diagram showing an example of word vectors created when determining a homogeneous segment.

FIG. 14 is a diagram showing an example of homogeneous segment determination results in Working Example 1.

FIG. 15 is a diagram showing an example of the result of morphologically analyzing a first text and a second text corresponding thereto.

FIG. 16 is a diagram showing an example of mutual information computed in Working Example 1.

FIG. 17 is a diagram showing an example of determination results as to whether the content of segments is described in second texts.

FIG. 18 is a diagram showing an example of segments that it has been determined should be described in a customer memo in Working Example 1.

FIG. 19 is a diagram showing an example of speech recognition texts used in Working Example 2.

FIG. 20 is a diagram showing an example of a customer memo set used in Working Example 2.

FIG. 21 is a diagram showing an example of phone call speech recognition results segmented by topic in Working Example 2.

FIG. 22 is a diagram showing an example of phone call speech recognition results segmented by phase in Working Example 2.

FIG. 23 is a diagram showing an example of homogeneous segment determination results in Working Example 3.

FIG. 24 is a diagram showing an example of similarity scores calculated in Working Example 4.

FIG. 25 is a diagram showing an example of inclusion scores calculated in Working Example 5.

BEST MODE FOR CARRYING OUT THE INVENTION

Embodiment 1

Figure 1:
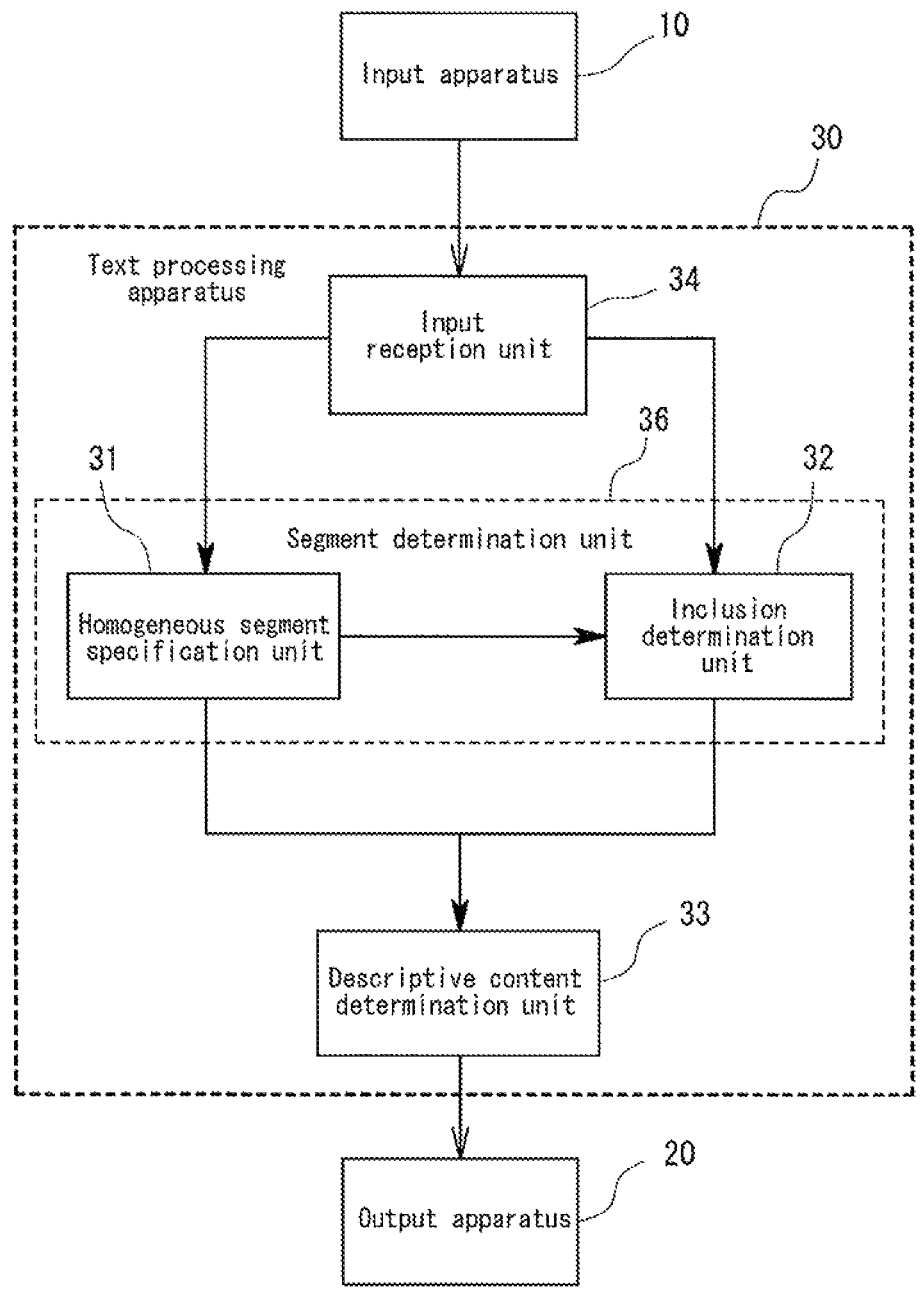
FIG. 1 is a block diagram showing a schematic configuration of a text processing apparatus in Embodiment 1 of the present invention.
Figure 2:
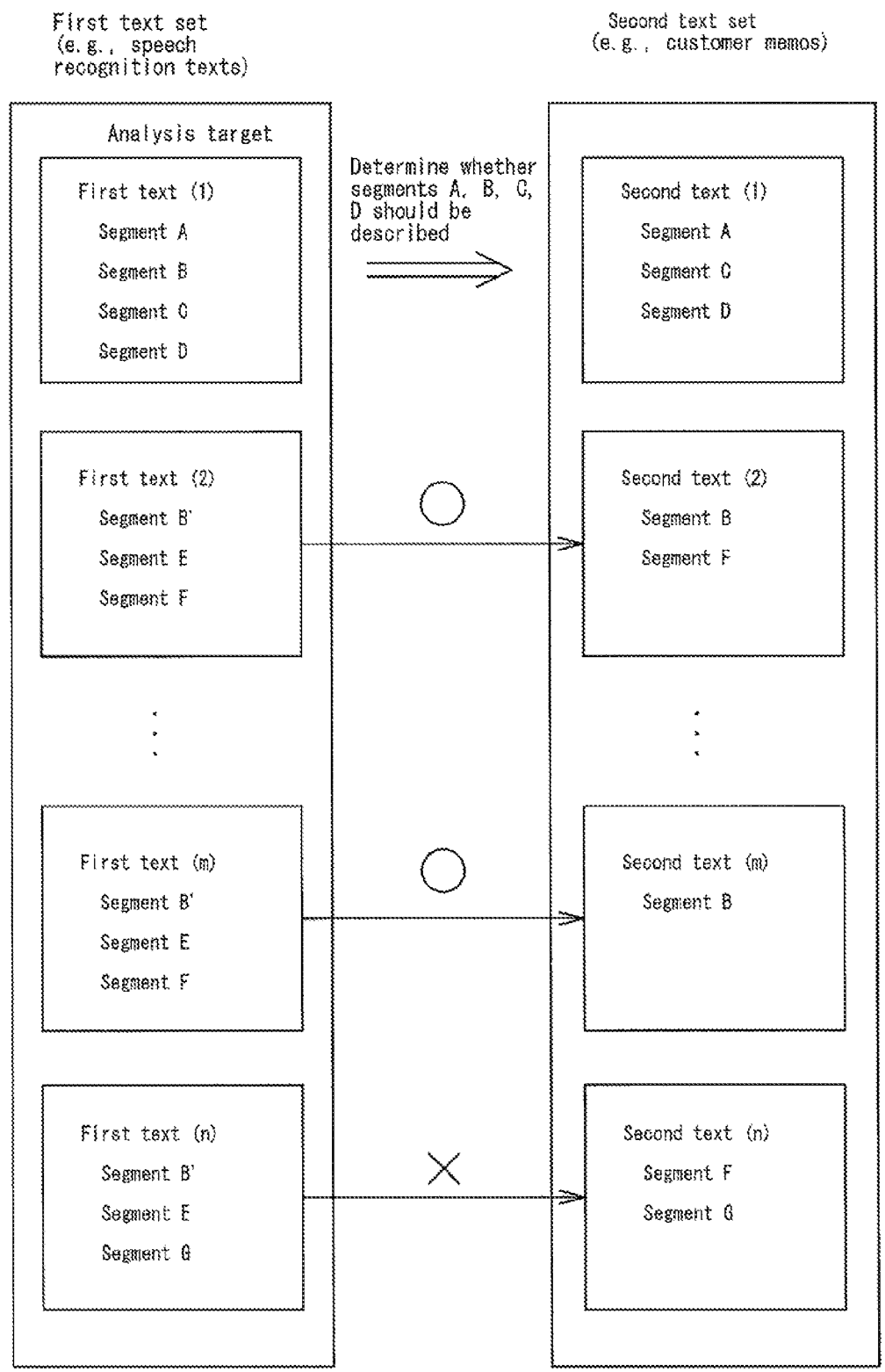
FIG. 2 is an explanatory diagram showing a principle of text processing in the present invention.

Hereinafter, a text processing apparatus, a text processing method and a program in Embodiment 1 of the present invention will be described with reference to FIGS. 1 to 3. Firstly, a configuration of the text processing apparatus in Embodiment 1 will be described using FIGS. 1 and 2. FIG. 1 is a block diagram showing a schematic configuration of the text processing apparatus in Embodiment 1 of the present invention. FIG. 2 is an explanatory diagram showing a principle of text processing in the present invention.

A text processing apparatus 30 in Embodiment 1 of the present invention shown in FIG. 1 implements an analysis process by contrasting a first text set and a second text set that serve as inputs. As shown in FIG. 2, the first text set is constituted by first texts (1) to (n). Also, the second text set is constituted by second texts (1) to (n) corresponding to the first texts. A first text and a second text corresponding thereto are generated around the same event through mutually different generation processes. Note that in FIG. 2, n and m are integers, where n>m.

In Embodiment 1, texts obtained by performing speech recognition on phone call speech in a call center are given as an example of first texts, as will also be shown in a later-mentioned Working Example 1. Customer memos prepared by an operator are given as examples of second texts in this case. Also, each text in the first text set and the second text set is explicitly segmented in advance into segments that serve as analysis units. Each text is in a state enabling machine processing in segment units in subsequent tasks performed by the text processing apparatus 30. Note that segments can be set based on sentences, paragraphs, topics, phases and the like, for example. Topics and phases will be specifically described in Embodiment 2.

As shown in FIG. 1, the text processing apparatus 30 is provided with a segment determination unit 36 and a descriptive content determination unit 33. The segment determination unit 36 determines, with respect to a homogeneous segment that is similar to the plurality of segments constituting a first text which is set as an analysis target (hereinafter, "analysis target text") and that is included in another first text, whether the content thereof is included in the second texts. The descriptive content determination unit 33 determines whether each segment constituting the analysis target text should be described in a second text corresponding to the analysis target text, based on a result of the determination by the segment determination unit 36.

In Embodiment 1, the segment determination unit 36 further is provided with a homogeneous segment specification unit 31 and an inclusion determination unit 32. The homogeneous segment specification unit 31 firstly contrasts each of the plurality of segments constituting the analysis target text with another first text. Subsequently, the homogeneous segment specification unit 31 specifies a segment similar to any of the plurality of segments constituting the analysis target text, from the plurality of segments constituting the other first text, and sets the specified segment as a homogeneous segment. The inclusion determination unit 32 determines whether the content of the homogeneous segment is included in a second text corresponding to the first text that includes the homogeneous segment (another first text that is different from the analysis target text).

In Embodiment 1, the descriptive content determination unit 33 derives an extent to which the content of the homogeneous segment is included in the second text corresponding to the first text that includes the homogeneous segment, based on a result of the determination by the inclusion determination unit 32. This extent may be a frequency at which the content of the homogeneous segment is described in the corresponding second text, or a percentage at which the content of the homogeneous segment is described in the corresponding second text.

Further, the descriptive content determination unit 33 derives a degree to which each segment constituting the analysis target text should be described in the second text corresponding to the analysis target text (hereinafter, "degree of association").

At this time, the descriptive content determination unit 33, in the case where the abovementioned extent is a frequency of description in the second text, calculates the degree of association such that the degree of association increases the higher the frequency. Further, the descriptive content determination unit 33, in the case where the above mentioned extent is a percentage of description in the second text, calculates the degree of association, such that the degree of association increases the higher the percentage. The descriptive content determination unit 33 then determines, using the calculated degree of association, whether each segment constituting the analysis target text should be described in the corresponding second text.

In Embodiment 1, an input apparatus 10 and an output apparatus 20 are connected to the text processing apparatus 30. The input apparatus 10 is an apparatus that inputs the first text set and the second text set into the text processing apparatus 30. Specific examples of the input apparatus 10 include an input device such as a keyboard, a computer apparatus that transmits text data via a network or the like, and a reading apparatus capable of reading a recording medium on which text data is recorded. The output apparatus 20 is an apparatus that outputs the result of analysis by the text processing apparatus 30, and specific examples of the output apparatus 20 include a display apparatus and a printing apparatus.

Also, in Embodiment 1, the text processing apparatus 30 is provided with an input reception unit 34. The input reception unit 34, on receiving the first text set and the second text set input by the input apparatus 10, inputs the first and second text sets to the homogeneous segment specification unit 31 and the inclusion determination unit 32. Further, the text processing apparatus 30 is realized by a computer that operates under the control of a program, and a CPU (central processing unit) of the computer functions as the homogeneous segment specification unit 31, the inclusion determination unit 32, and the descriptive content determination unit 33.

Next, the text processing method in Embodiment 1 of the present invention will be described using FIG. 3. FIG. 3 is a flowchart showing a flow of processing performed with the text processing method in Embodiment 1 of the present invention. In Embodiment 1, the text processing method is implemented by operating the text processing apparatus 30 of Embodiment 1 shown in FIG. 1. The following description of the text processing method will thus be provided in conjunction with description of the operation of the text processing apparatus 30 shown in FIG. 1, while appropriately taking FIG. 1 and FIG. 2 into consideration.

Figure 3:
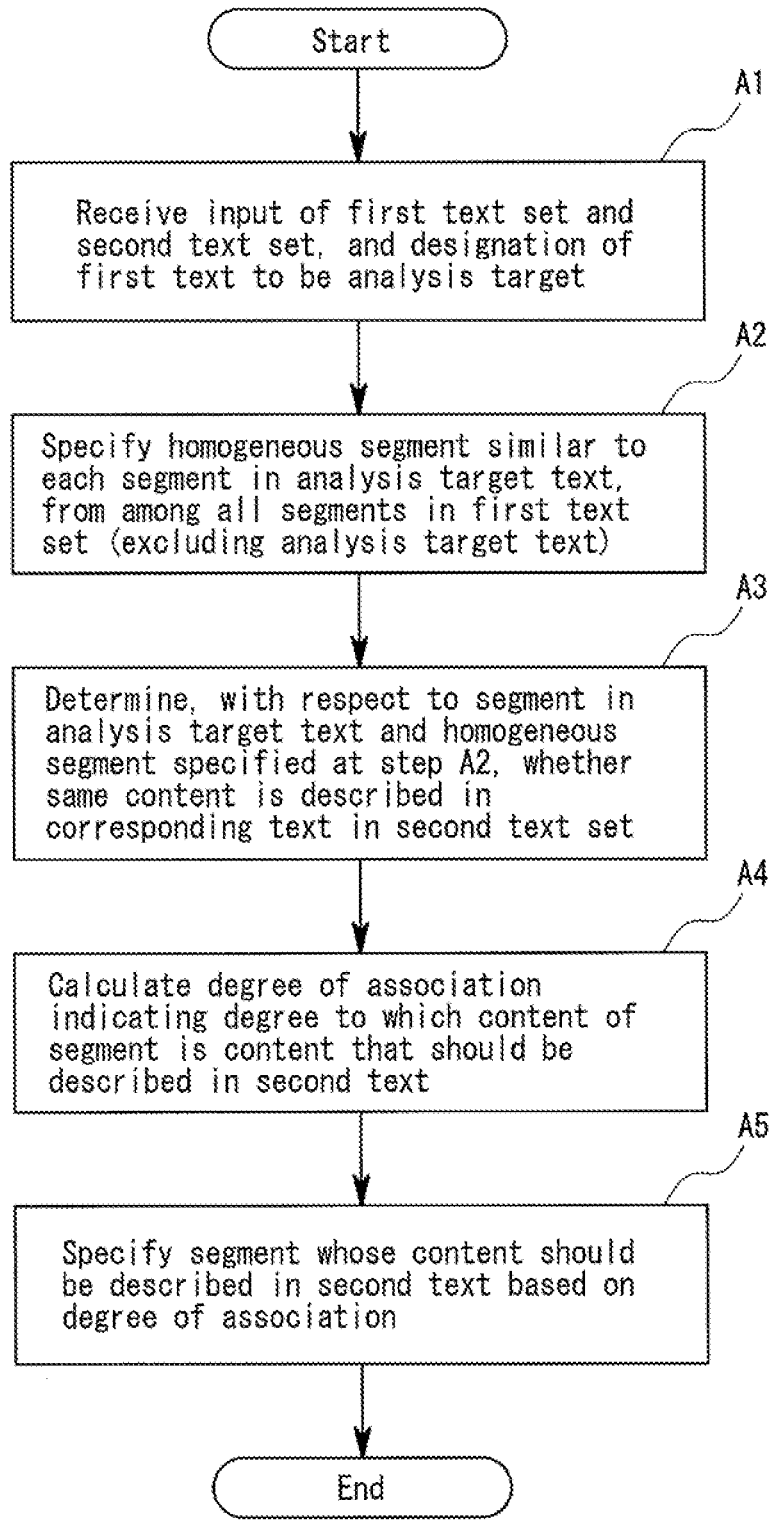
FIG. 3 is a flowchart showing a flow of processing performed with the text processing method in Embodiment 1 of the present invention.

As shown in FIG. 3, firstly, the input reception unit 34 receives two sets consisting of a first text set and a second text set (see FIG. 2) from the input apparatus 10 as inputs, and subsequently receives specification of a first text in the first text set that is to be targeted for analysis (step A1).

Specifically, as shown in FIG. 2, for example, input of a first text set constituted by the first texts (1) to (n) and a second text set constituted by second texts (1) to (n) is received. In FIG. 2, first texts and second texts whose parenthesized numerals coincide are generated around the same event using different generation processes, and correspond to each other. In the example in FIG. 2, the first text (1) is designated as the analysis target.

Subsequently, the homogeneous segment specification unit 31 specifies a homogeneous segment that is similar to each of segments A to D, from among all segments in the first texts set excluding the analysis target text (step A2). In the example in FIG. 2, a segment B' is determined to be a homogeneous segment of segment B. Note that homogeneous segments are, in actual fact, also specified for segments (segments A, C and D) other than segment B. The example in FIG. 2 shows the case where segment B, in particular, is focused on.

Next, the inclusion determination unit 32 determines whether the content of the homogeneous segment specified at step A2 is described in corresponding texts in the second text set (step A3). In the example in FIG. 2, the homogeneous segment B' is described in the second texts (2) and (m). In Embodiment 1, the inclusion determination unit 32 also determines whether the content of each segment (segments A to D) in the analysis target text is described in the corresponding text in the second text set.

Subsequently, the descriptive content determination unit 33 derives an extent to which the content of the homogeneous segment is included in corresponding second texts, based on the result of the determination in step A3, and calculates the degree of association based on the derived extent (step A4). Note that, as described above, the degree of association denotes a degree to which each segment constituting the analysis target text should be described in the corresponding second text. Also, in Embodiment 1, the result of determining whether the content of each segment in the analysis target text is included in the corresponding text in the second text set is also utilized in calculating the degree of association.

Thereafter, the descriptive content determination unit 33 determines whether each of segments A to D constituting the analysis target text should be described in the second text, based on the degree of association of each segment calculated at step A4. Then, based on the determination result, the descriptive content determination unit 33 specifies, among the segments constituting the analysis target text, a segment that should be described in the second text, and output the specified segment to the output apparatus 20 (step A5).

Note that the descriptive content determination unit 33 may output only a segment that should be described in the second text, or may also output the degree of association derived at step A5 together with the specified segment. Also, in the example in FIG. 2, segment B is specified as a segment that should be described in the second text, but this is merely by way of example, and another segment may be specified as a segment that should be described in the second text.

The program in Embodiment 1 can be a program that includes commands for causing a computer to execute steps A1 to A5 shown in FIG. 3. The text processing apparatus 30 in Embodiment 1 can be realized by installing the program of Embodiment 1 in a computer and executing the installed program. In this case, as mentioned above, the CPU of the computer functions as the homogeneous segment specification unit 31, the inclusion determination unit 32 and the descriptive content determination unit 33 to perform processing.

Also, the program in Embodiment 1 is supplied in a state of being stored on a computer-readable recording medium, examples of which include an optical disc, a magnetic disk, a semiconductor memory and a floppy disk, or via a network.

In Embodiment 1, the descriptive content determination unit 33 thus takes into consideration whether the content of a homogeneous segment is described in a corresponding text in the second text set in determining whether each segment constituting the analysis target text should be described in the second text. Therefore, it is possible to correctly determine content that should be described, even if some information that should be written in the second text is absent, unlike the case where the determination is performed with only information indicating whether the content of segments of the analysis target text is described in a corresponding second text.

In other words, it is highly probable that if absent information that should originally be written in the second text appears in a first text other than the analysis target text, this information will also be described in the text corresponding thereto in the second text set. For example, the content of the homogeneous segment B' of the segment B in FIG. 2 is described in second texts. Accordingly, if the degree to which the content of a homogeneous segment that exists in first texts other than the analysis target text is described in texts in the second text set corresponding to the homogeneous segment is high, it can be judged that the content of the segment from which the homogeneous segment originates is content that should be written in the second text. As a result, it can be correctly judged whether the content of segments constituting the analysis target text should be described in the second text.

Embodiment 2

Figure 4:
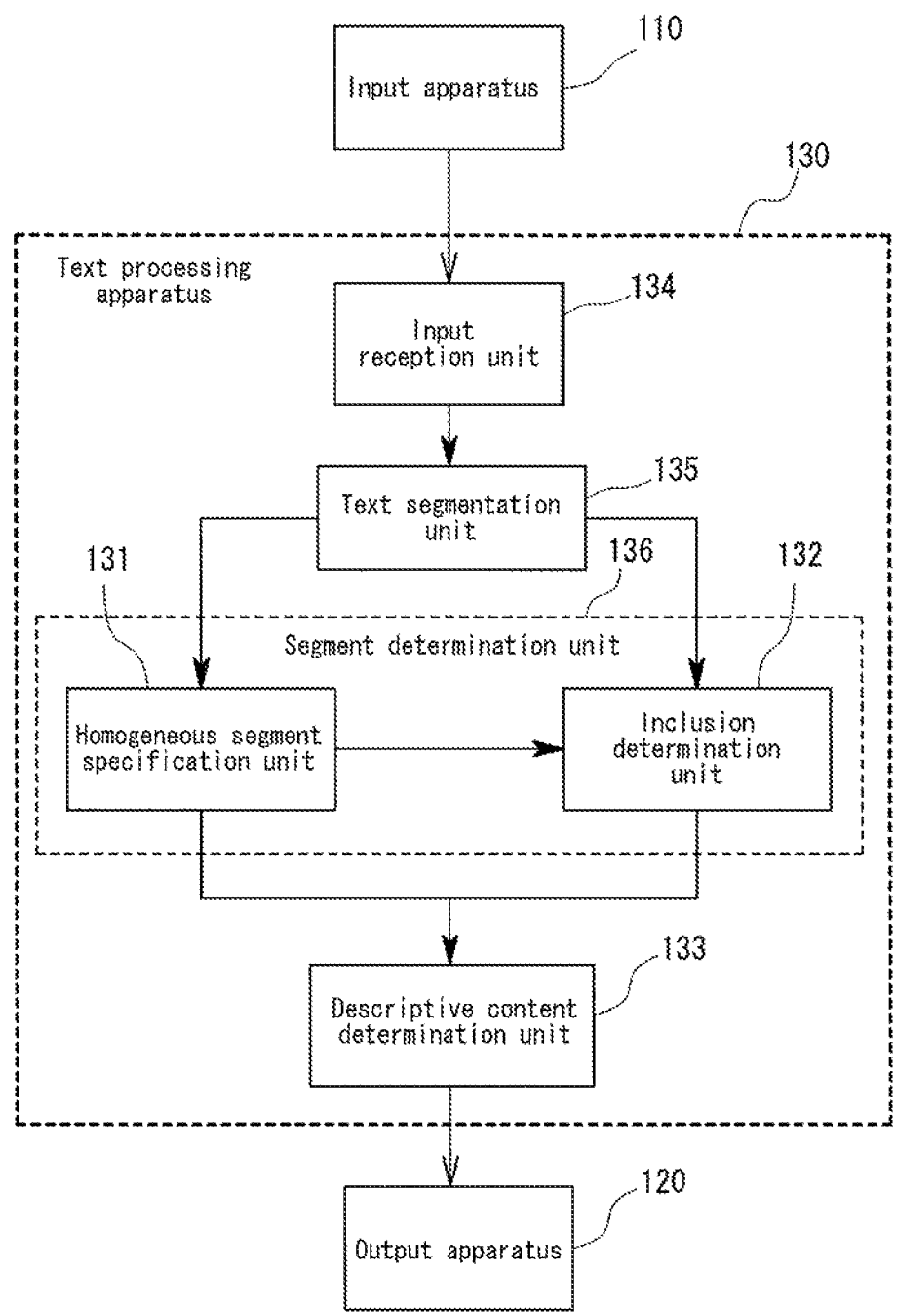
FIG. 4 is a block diagram showing a schematic configuration of a text processing apparatus in Embodiment 2 of the present invention.

Next, a text processing apparatus, a text processing method and a program in Embodiment 2 of the present invention will be described in detail with reference to FIG. 4 and FIG. 5. Firstly, a configuration of the text processing apparatus in Embodiment 2 will be described using FIG. 4. FIG. 4 is a block diagram showing a schematic configuration of the text processing apparatus in Embodiment 2 of the present invention.

As shown in FIG. 4, a text processing apparatus 130 in Embodiment 2 is provided with a text segmentation unit 135, this being the difference from the text processing apparatus 30 in Embodiment 1 shown in FIG. 1. Apart from this difference, the text processing apparatus 130 is constituted similarly to the text processing apparatus 30 shown in FIG. 1.

Note that the text processing apparatus 130 is provided with a segment determination unit 136, a descriptive content determination unit 133 and an input reception unit 134, and, further, the segment determination unit 136 is provided with a homogeneous segment specification unit 131 and an inclusion determination unit 132. These constituent elements are, however, respectively similar to the segment determination unit 36 (includes the homogeneous segment specification unit 31 and the inclusion determination unit 32), the descriptive content determination unit 33 and the input reception unit 34 shown in FIG. 1. The text processing apparatus 130 is also realized by a computer that operates under the control of a program, similarly to the text processing apparatus 30 shown in FIG. 1. Further, an input apparatus 110 and an output apparatus 120 are respectively similar to the input apparatus 10 and the output apparatus 20 shown in FIG. 1.

The text segmentation unit 135 shown in FIG. 4 segments a first text based on at least one of sentences, paragraphs, topics and phases included in therein, and sets a plurality of segments. In the present embodiment, the text segmentation unit 135 is able to perform segmentation on a second text, and to segment the second text into a plurality of segments.

Here, sentences used in segment setting are units of character sets that are separated by periods "." and commas ",". "Paragraphs" are sets of one or more sentences, and are units that are set manually or automatically. "Topics" are so-called subjects, and in the case where a text is segmented by topic, a portion in which the same or similar words appear repeatedly will be a single segment.

"Phases" are units divided by stock phrases used in specific fields (e.g., stock phrases set out in a customer service manual) or the like. Taking the example of a call center, each scene of a single flow from "greetings" to "finding out what the call is about" to "finding out the customer information" to "terminating the call" is a phase.

Next, a text processing method in Embodiment 2 of the present invention will be described using FIG. 5. FIG. 5 is a flowchart showing a flow of processing performed with the text processing method in Embodiment 2 of the present invention. In Embodiment 2, the text processing method is implemented by operating the text processing apparatus 130 of Embodiment 2 shown in FIG. 4. The following description of the text processing method will thus be provided in conjunction with description of the operation of the text processing apparatus 130 shown in FIG. 4, while appropriately taking FIG. 4 into consideration.

Figure 5:
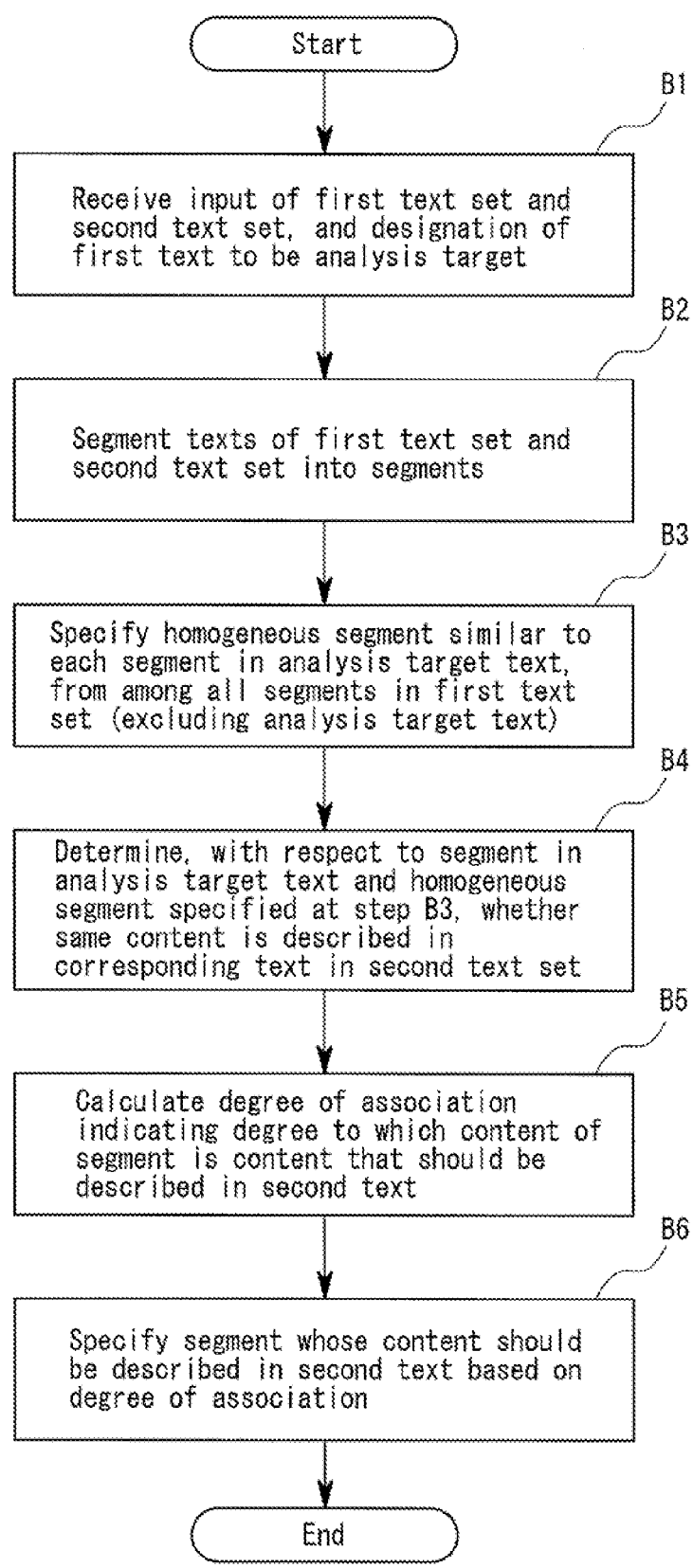
FIG. 5 is a flowchart showing a flow of processing performed with the text processing method in Embodiment 2 of the present invention.

As shown in FIG. 5, firstly, the input reception unit 134 receives two sets consisting of a first text set and a second text set from the input apparatus 110 as inputs, and subsequently receives specification of a first text in the first text set that is to be targeted for analysis (step B1). Step B1 is performed similarly to step A1 of Embodiment 1. In step B1, however, different from step A1, each text in an input first text set and second text set does not necessarily need to have been segmented into segments serving as analysis units (e.g., sentences, paragraphs, topics, phases of subjects, etc.).

Subsequently, the text segmentation unit 135 segments each text in the first text set and the second text set, and sets a plurality of segments that serve as analysis units (step B2). Thereafter, the processing of steps B3 to B6 is performed on the first text set and the second text set that have been segmented. The following processing of steps B3 to B6 are, however, respectively similar to the processing of steps A2 to A5 shown in FIG. 3 in Embodiment 1, and description of steps B3 to B6 will be omitted.

The program in Embodiment 2 can be a program that includes commands for causing a computer to execute steps B1 to B6 shown in FIG. 5. The text processing apparatus 130 in Embodiment 2 can be realized by installing the program of Embodiment 2 in a computer and executing the installed program. In this case, the CPU of the computer functions as the homogeneous segment specification unit 131, the inclusion determination unit 132, the descriptive content determination unit 133 and the text segmentation unit 135 to perform processing.

Also, the program in Embodiment 2 is supplied in a state of being stored on a computer-readable recording medium, examples of which include an optical disc, a magnetic disk, a semiconductor memory and a floppy disk, or via a network.

In Embodiment 2, the text segmentation unit 135 is able to segment each text in the first text set and the second text set, and set segments as analysis units. Therefore, in Embodiment 2, each text in the first text set and second text set input from the input apparatus 110 need not have been segmented in advance into segments serving as analysis units. According to Embodiment 2, segmentation into segment units that are effective in utilizing information on homogeneous segments can be performed according to the type of text, or the like. As a result, the accuracy of the final output also improves, since text analysis is performed in suitable segment units.

Also, Embodiment 2 is similar to Embodiment 1, apart from segments being set after input of the first text set and the second text set, and similar effects to Embodiment 1 can be obtained in the case of using Embodiment 2.

Embodiment 3

Figure 6:
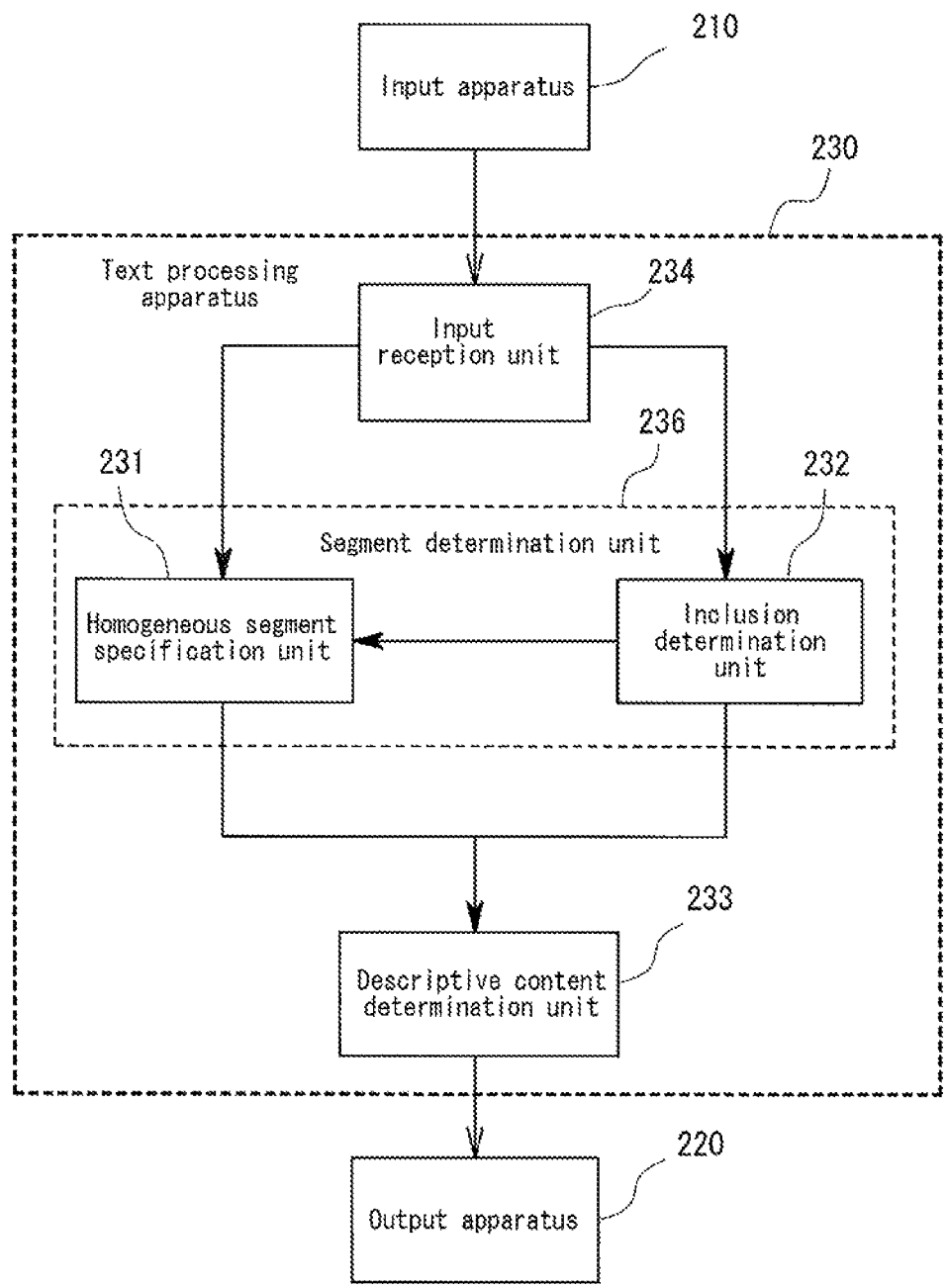
FIG. 6 is a block diagram showing a schematic configuration of a text processing apparatus in Embodiment 3 of the present invention.

Next, a text processing apparatus, a text processing method and a program in Embodiment 3 of the present invention will be described in detail with reference to FIGS. 6 and 7. Firstly, a configuration of the text processing apparatus in Embodiment 3 will be described using FIG. 6. FIG. 6 is a block diagram showing a schematic configuration of the text processing apparatus in Embodiment 3 of the present invention.

As shown in FIG. 6, a text processing apparatus 230 in Embodiment 3 is provided with an input reception unit 234, a segment determination unit 236 and a descriptive content determination unit 233, similarly to the text processing apparatus 30 in Embodiment 1. Also, the segment determination unit 236 is provided with a homogeneous segment specification unit 231 and an inclusion determination unit 232. Further, the text processing apparatus 230 is realized by a computer that operates under the control of a program.

In Embodiment 3, however, the homogeneous segment specification unit 231 and the inclusion determination unit 232 differ from the homogeneous segment specification unit 31 and the inclusion determination unit 32 shown in FIG. 1 in Embodiment 1 in terms of the processing respectively executed. This difference will be described hereinafter.

In Embodiment 3, the inclusion determination unit 232 determines, for the plurality of segments respectively constituting all of the first texts, whether the content of each segment is included in a second text corresponding to the first text including the segment.

The homogeneous segment specification unit 231 contrasts each of plurality of segments constituting the analysis target text with a segment that is determined by the inclusion determination unit 232 to be included in a second text and that is included in another first text different from the analysis target text. Further, the homogeneous segment specification unit 231 specifies a segment that is similar to any of the plurality of segments constituting the analysis target text, and sets this segment as a homogeneous segment.

Note that the descriptive content determination unit 233 and the input reception unit 234 are respectively similar to the descriptive content determination unit 33 and the input reception unit 34 shown in FIG. 1. Further, the input apparatus 210 and the output apparatus 220 are respectively similar to the input apparatus 10 and the output apparatus 20 shown in FIG. 1

Next, a text processing method in Embodiment 3 of the present invention will be described using FIG. 7. FIG. 7 is a flowchart showing a flow of processing performed with the text processing method in Embodiment 3 of the present invention. In Embodiment 3, the text processing method is implemented by operating the text processing apparatus 230 of Embodiment 3 shown in FIG. 6. The following description of the text processing method will thus be provided in conjunction with description of the operation of the text processing apparatus 230 shown in FIG. 6, while appropriately taking FIG. 6 into consideration.

Figure 7:
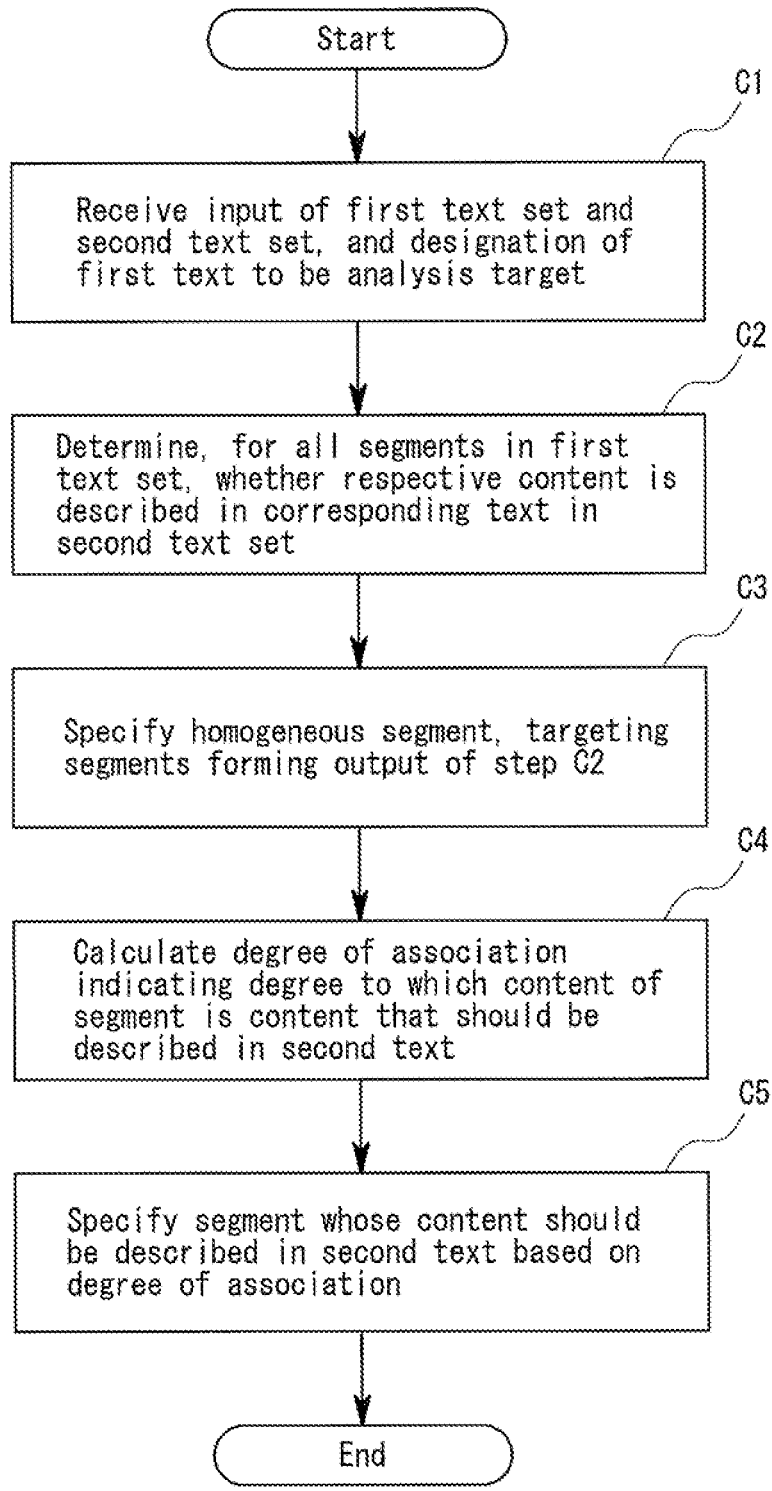
FIG. 7 is a flowchart showing a flow of processing performed with the text processing method in Embodiment 3 of the present invention.

As shown in FIG. 7, firstly, the input reception unit 234 receives input of a first text set and a second text, and subsequently receives designation of a first text in the first text set that will be targeted for analysis, similarly to step A1 of Embodiment 1 shown in FIG. 3 (step C1).

Subsequently, the inclusion determination unit 232 determines, for all segment of texts in the first text set, whether the content of each segment is described (included) in a corresponding text in the second text set (step C2).

Subsequently, the homogeneous segment specification unit 231 specifies a set of segments whose content is determined in step C2 to be described in a corresponding second text, and that are included in another first text different from the analysis target text. Further, the homogeneous segment specification unit 231 specifies, from this segment set, a homogeneous segment that is similar to each segment of the first text (step C3).

Subsequently, the descriptive content determination unit 233 calculates, based on the results of steps C2 and C3, a degree of association indicating the degree to which the content of each segment in the first text is content that should be described in a second text (step C4). Specifically, in step C4, whether or not the content of a segment is described in a second text and the extent to which there exist homogeneous segments whose content is described in a corresponding text in the second text set are used in the calculation.

Thereafter, the descriptive content determination unit 233 specifies, among the segments of the analysis target text, a segment that should be described in the second text, and outputs the specified text to the output apparatus 220 (step C5). Step C5 is a similar step to step A5 in Embodiment 1.

Note that in Embodiment 3, the text processing apparatus 230 may be provided with a text segmentation unit 135, similarly to Embodiment 2. In this case, step B2 shown in FIG. 5 is implemented between step C1 and step C2. This enables sets of texts that have not been segmented in advance into segments that serve as analysis units to be received as a first text set and a second text set serving as inputs.

The program in Embodiment 3 can be a program that includes commands for causing a computer to execute steps C1 to C5 shown in FIG. 7. The text processing apparatus 230 in Embodiment 3 can be realized by installing the program of Embodiment 3 in a computer and executing the installed program. In this case, as mentioned above, the CPU of the computer functions as the homogeneous segment specification unit 231, the inclusion determination unit 232, and the descriptive content determination unit 233 to perform processing.

Also, the program in Embodiment 3 is supplied in a state of being stored on a computer-readable recording medium, examples of which include an optical disc, a magnetic disk, a semiconductor memory and a floppy disk, or via a network.

In Embodiment 3, the search range for searching for a homogeneous segment is a set of segments for which the same content is written in a corresponding text in the second text set. According to Embodiment 3, the homogeneous segment search can thus be performed faster compared with Embodiments 1 and 2 in which all segments of first texts other than the analysis target text are search targets, when specifying a homogeneous segment. Similar effects to Embodiment 1 can also be obtained in the case of using Embodiment 3, since the degree of association is calculated based on the extent to which there exist homogeneous segments whose content is described in a second text.

Embodiment 4

Next, a text processing apparatus, a text processing method and a program in Embodiment 4 of the present invention will be described in detail with reference to FIG. 8. The text processing apparatus in Embodiment 4 is constituted similarly to the text processing apparatus 30 in Embodiment 1 shown in FIG. 1. Therefore, FIG. 1 will be appropriately taken into consideration in the following description.

In Embodiment 4, processing performed by the homogeneous segment specification unit 31 and the inclusion determination unit 33 differs from Embodiment 1. Specifically, in Embodiment 4, the homogeneous segment specification unit 31, in addition to the specification of a homogeneous segment, computes a similarity score representing an extent of similarity between each of the plurality of segments constituting the analysis target text and the homogeneous segment. Also, the descriptive content determination unit 33 further calculates a degree of association, using the similarity score computed by the homogeneous segment specification unit 31.

Next, the text processing method in Embodiment 4 of the present invention will be described using FIG. 8. FIG. 8 is a flowchart showing a flow of processing performed with the text processing method in Embodiment 4 of the present invention. In Embodiment 4, the text processing method is implemented by operating the text processing apparatus of Embodiment 4. The following description of the text processing method will thus be provided in conjunction with description of the operation of the text processing apparatus, while appropriately taking FIG. 1 into consideration.

Figure 8:
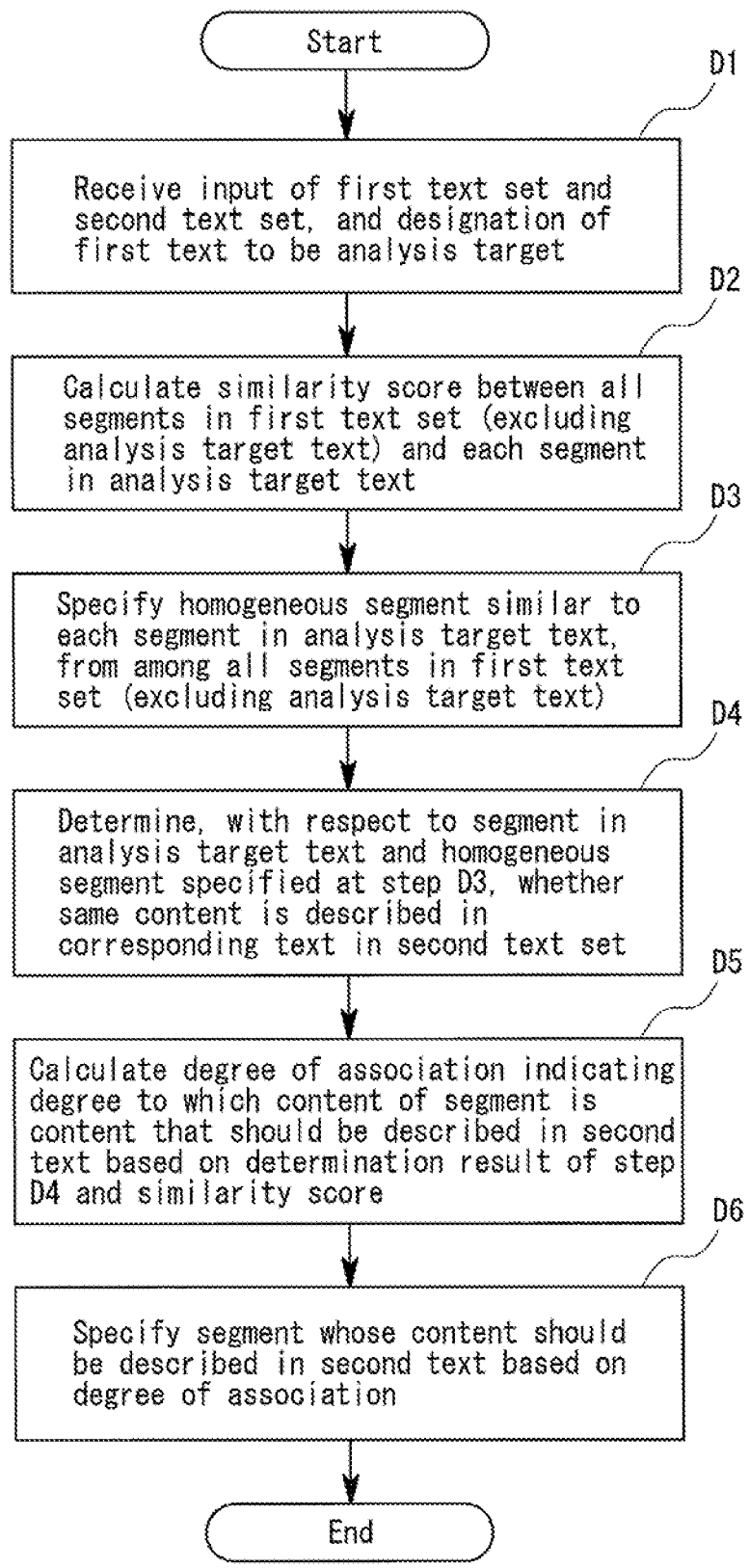
FIG. 8 is a flowchart showing a flow of processing performed with the text processing method in Embodiment 4 of the present invention.

As shown in FIG. 8, firstly, the input reception unit 34 receives input of a first text set and a second text, and subsequently receives designation of a first text in the first text set that will be targeted for analysis, similarly to step A1 of Embodiment 1 shown in FIG. 3 (step D1).

Next, the homogeneous segment specification unit 31 computes a similarity score representing an extent of similarity between each of the plurality of segments constituting the analysis target text and the homogeneous segment, targeting all segments in the first text set (step D2). This similarity score indicates the extent to which two segments are the same.

Subsequently, the homogeneous segment specification unit 31 specifies a homogeneous segment of each segment in the analysis target text, from among all segments in the first text set other than the analysis target text, based on the similarity score computed at step D2 (step D3).

Next, the inclusion determination unit 32 determines whether the content of the homogeneous segment is described in a corresponding text in the second text set, similarly to step A3 shown in FIG. 3 in Embodiment 1 (step D4). Also, in step D4, the inclusion determination unit 32 determines whether the content of each segment in the analysis target text is described in a corresponding text in the second text set.

Subsequently, the descriptive content determination unit 33 calculates, for each segment of the analysis target text, a degree of association indicating the degree to which the content of the segment is content that should be described in a second text, based on the determination result of step D4 and the similarity score of step D2 (step D5).

Thereafter, the descriptive content determination unit 33 specifies, among the segments of the analysis target text, a segment that should be described in the second text, and outputs the specified text to the output apparatus 20 (step D6). Step D6 is a similar step to step A5 in Embodiment 1.

The program in Embodiment 4 can be a program that includes commands for causing a computer to execute steps D1 to D6 shown in FIG. 8. The text processing apparatus in Embodiment 4 can be realized by installing the program of Embodiment 4 in a computer and executing the installed program. In this case, as mentioned above, the CPU of the computer functions as the homogeneous segment specification unit 31, the inclusion determination unit 32, and the descriptive content determination unit 33 to perform processing.

Also, the program in Embodiment 4 is supplied in a state of being stored on a computer-readable recording medium, examples of which include an optical disc, a magnetic disk, a semiconductor memory and a floppy disk, or via a network.

In Embodiment 4, since the descriptive content determination unit 33 uses a similarity score, information indicating whether the content of a segment is described in a corresponding text in the second text set is more stringent than the case of Embodiment 1. In other words, in Embodiment 4, the influence of segments that can be determined to be exactly the same is greater than the influence of segments that are not very similar. Accordingly, Embodiment 4 enables an improvement in the accuracy of the final output to be achieved.

Similar effects to Embodiment 1 can also be obtained in the case of using Embodiment 4, since the degree of association is calculated based on the extent to which there exist homogeneous segments whose content is described in a second text.

Note that in Embodiment 4, step B2 in Embodiment 2 can be performed before executing steps D2 and D3. In this case, effects similar to Embodiment 2 are acquired. Also, step D4 in the present embodiment can also be applied to step C4 in Embodiment 3, and a similarity score representing the extent to which two segments are the same can be used when calculating the degree of association of segments in step C4.

Specifically, step D2 can be executed after step C3 of Embodiment 3, and a similarity score representing the extent to which each segment of the analysis target text and a segment determined in step C3 to be a homogeneous segment are the same can be saved. In this case, the effects of Embodiment 4 can be assigned to Embodiment 3.

Embodiment 5

Next, a text processing apparatus, a text processing method and a program in Embodiment 5 of the present invention will be described in detail with reference to FIG. 9. The text processing apparatus in Embodiment 5 is constituted similarly to the text processing apparatus 30 of Embodiment 1 shown in FIG. 1. Therefore, FIG. 1 will be appropriately taken into consideration in the following description.

In Embodiment 5, processing performed by the inclusion determination unit 32 and the descriptive content determination unit 33 differs from Embodiment 1. Specifically, the inclusion determination unit 32, in addition to the determination regarding the content of the homogeneous segment, computes an inclusion score for each of the plurality of segments constituting the analysis target text and for the homogeneous segment. The inclusion score is a score representing the possibility of the content of each segment being included in a second text corresponding to a first text that includes the segment. The descriptive content determination unit 33 is able to further derive the degree of association, using the inclusion score computed by the inclusion determination unit 32, such that the degree of association increases the higher the inclusion score.

Next, the text processing method in Embodiment 5 of the present invention will be described using FIG. 9. FIG. 9 is a flowchart showing a flow of processing performed with the text processing method in Embodiment 5 of the present invention. In Embodiment 5, the text processing method is implemented by operating the text processing apparatus of Embodiment 5. The following description of the text processing method will thus be provided in conjunction with description of the operation of the text processing apparatus, while appropriately taking FIG. 1 into consideration.

Figure 9:
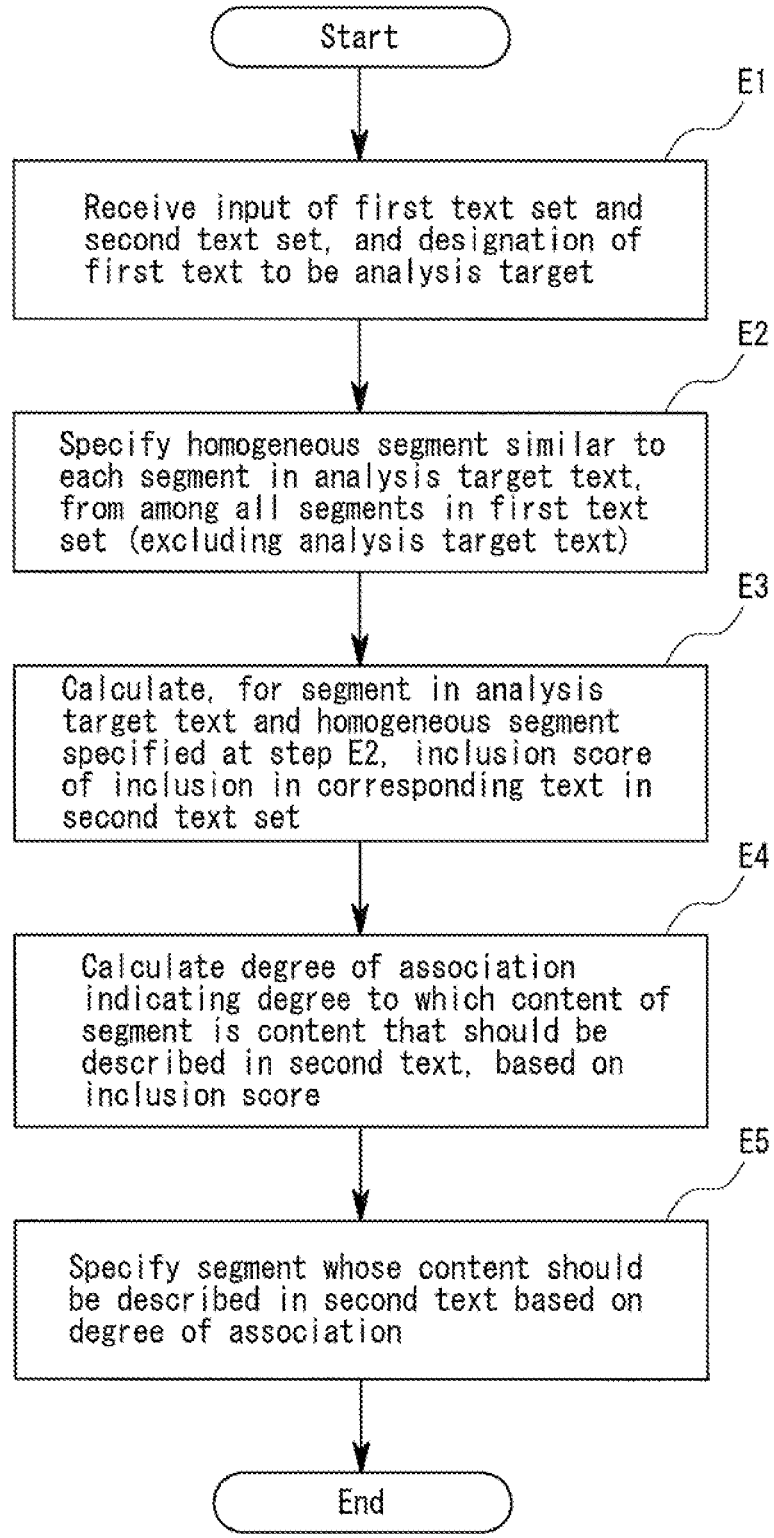
FIG. 9 is a flowchart showing a flow of processing performed with the text processing method in Embodiment 5 of the present invention.

As shown in FIG. 9, firstly, the input reception unit 34 receives input of a first text set and a second text, and subsequently receives designation of a first text in the first text set that will be targeted for analysis, similarly to step A1 of Embodiment 1 shown in FIG. 3 (step E1).

Next, the homogeneous segment specification unit 31 specifies, from among all segments in the first text set excluding the analysis target text, a homogeneous segment that is similar to each segment in the analysis target text (step E2). Step E2 is a similar step to step A2 of Embodiment 1 shown in FIG. 3.

Subsequently, the inclusion determination unit 32 determines, for each segment in the analysis target text and for the segment determined to be the homogeneous segment of the segment at step E2, whether the same content is described in the corresponding text in the second text set. Further, the inclusion determination unit 32, in addition to this determination, calculates, for each segment in the analysis target text and for the homogeneous segment, an inclusion score representing the possibility of the same content being described (step E3).

Subsequently, the descriptive content determination unit 33 calculates, for each segment of the analysis target text, a degree of association indicating a degree to which the content of the segment is content that should be described in a second text, based on the inclusion score calculated at step E3 (step E4). In other words, at step E4, an inclusion score representing the possibility of the content of each segment in the analysis target text being described in the second text and an inclusion score representing the possibility of the content of the homogeneous segment being described in a corresponding text of a second text set are used. Further, in step E4, the degree of association increases the higher the inclusion score.

Thereafter, the descriptive content determination unit 33 specifies, among the segments of the analysis target text, a segment that should be described in the second text, and outputs the specified text to the output apparatus 20 (step E6). Step E6 is a similar step to step A5 in Embodiment 1.

The program in Embodiment 5 can be a program that includes commands for causing a computer to execute steps E1 to E5 shown in FIG. 9. The text processing apparatus in Embodiment 5 can be realized by installing the program of Embodiment 5 in a computer and executing the installed program. In this case, as mentioned above, the CPU of the computer functions as the homogeneous segment specification unit 31, the inclusion determination unit 32 and the descriptive content determination unit 33 to perform processing.

Also, the program in Embodiment 5 is supplied in a state of being stored on a computer-readable recording medium, examples of which include an optical disc, a magnetic disk, a semiconductor memory and a floppy disk, or via a network.

In Embodiment 5, the descriptive content determination unit 33 thus uses an inclusion score representing the possibility of the same content being described in a corresponding text in the second text set, when calculating the degree of association. Information indicating whether the content of a segment is described in a corresponding text in the second text set is more stringent than Embodiment 1. In other words, the degree of association will be higher when there is a segment that has a high possibility of being described in a corresponding text in the second text set than the case where a segment has a low possibility. Accordingly, Embodiment 5 also enables an improvement in the accuracy of the final output to be achieved.

Also, similar effects to Embodiment 1 can also be obtained in the case of using Embodiment 5, since the degree of association is calculated based on the extent to which there exist homogeneous segments whose content is described in a second text.

Note that step B4 of Embodiment 2 can be replaced by step E3 of Embodiment 5, and, further, that step B5 can be replaced by step E4. This allows similar effects to Embodiment 5 to also be obtained in Embodiment 2.

Also, when calculating the degree of association of a segment in step C4 of Embodiment 3, an inclusion score representing the possibility of the content of a segment being described in a corresponding text in the second text set can also be taken into consideration, such as in step E4 of Embodiment 5. In this case, similar effects to Embodiment 5 are also obtained in Embodiment 3.

Specifically, step C2 of Embodiment 3 can be changed to the following operation: The inclusion determination unit 232 calculates, with respect to all segment of the texts in the first text set, an inclusion score representing the possibility of the content being described in a corresponding text in the second text set. The inclusion determination unit 232 then determines whether the content is described in the corresponding text in the second text set, based on the calculated inclusion score (step C2).

Step C4 of Embodiment 3 can then be changed to the following operation: The descriptive content determination unit 233 calculates a degree of association for each segment in the analysis target text, based on the inclusion score for the segment calculated by inclusion determination unit 232 and the inclusion score for the homogeneous segment of the segment (step C4).

Also, step D4 of Embodiment 4 may be replaced by step E3 of Embodiment 5, and step D5 may be replaced by the following operation: The descriptive content determination unit 33 calculates a degree of association for each segment in the analysis target text, based on an inclusion score for the segment and an inclusion score for the homogeneous segment of the segment that are calculated similarly to step E3, and on a similarity score representing the extent to which the two segments are the same, derived at step D2 (step D5). This enables similar effects to Embodiment 5 to also be obtained in Embodiment 4.

Working Example 1

Hereinafter, a specific working example of the text processing apparatus and the text processing method in Embodiment 1 will be described, with reference to FIGS. 10 to 18. Also, the operation of the text processing apparatus in Embodiment 1 will be described according to the flowchart shown in FIG. 3. Note that FIG. 1 will also be appropriately taken into consideration.

In Working Example 1, the first text set is, as shown in FIG. 10, a set of speech recognition texts obtained by performing speech recognition on phone call speech in a call center. The second text set is, as shown in FIG. 11, a set of customer memos for calls serving as the recognition source of the speech recognition text set shown in FIG. 10. In Working Example 1, portions that should be written in the inquiry content of a customer memo are determined within each text in the speech recognition text set. FIG. 10 is a diagram showing an example of speech recognition texts used in Working Example 1. FIG. 11 is a diagram showing an example of a customer memo set used in Working Example 1.

Step A1: Input Reception Process

Firstly, the input reception unit 34 receives a set of phone call speech recognition results of phone call speech as a first text set, and a set of customer memos corresponding to the speech recognition results as a second text set. Further, the input reception unit 34 also receives specification of a first text that will be targeted for analysis from the first text set (step A1).

These input texts have been explicitly segmented in advance into segments that serve as analysis units, as shown in FIG. 10 and FIG. 11, and are assumed to be in a form that enables machine processing in segment units in subsequent tasks. In Working Example 1, the setting of segments in the first text set and the second text set is performed based on sentences (blocks separated by a period "." or a question mark "?")

Step A2: Specification of Homogeneous Segments

Next, in Working Example 1, the homogeneous segment specification unit 31 specifies a homogeneous segment that is similar to each segment in the first texts, targeting all segments in the first text set (see FIG. 10). Here, determination of a homogeneous segment performed with regard to 15280-1 "Omataseitashimashita, ABC koru senta desu." (I'm sorry to have kept you waiting, you have reached ABC Call Center.), 15280-33 "Nanika era wa hyoji sareteimasu ka?" (Is there an error message displayed?), and 15281-1 "Hai, ABC koro senta desu." (Hello, you have reached ABC Call Center.) shown in FIG. 10 will be described.

Morphological Analysis

Firstly, morphological analysis is implemented on all segments in the set of speech recognition results. As a result, the morphological analysis results shown in FIG. 12, for example, are obtained. FIG. 12 is a diagram showing an example of the analysis results of morphological analysis performed when determining a homogeneous segment.
Generation of Word Vectors Next, vectors in which a single morpheme corresponds to a single dimension, and the total number of morphemes represents the number of dimensions are generated using independent words. Specifically, for each segment, a word vector is generated in which elements corresponding to morphemes constituting the segment are 1, and elements corresponding to morphemes that are not included in the segment are 0, as shown in FIG. 13. FIG. 13 is a diagram showing an example of word vectors created when determining a homogeneous segment. In FIG. 13, a dimension-word allocation table and an example of word vectors based thereon are shown.
Clustering Next, a general clustering technique such as PLSI or k-means clustering using cosine similarity, for example, is executed on the word vector generated for each segment. Executing these clustering techniques enables similar segments to be organized into classes, and the classes to each be viewed as a group of homogeneous segments. Segments belonging to the same class are determined to be homogeneous segments.

Specifically, for example, k-means clustering involves allocating the center of a cluster to an arbitrary segment, and classifying another segment that is closest to the center of the cluster into the same class, using cosine similarity. Thereafter, an average of the elements resulting from this classification is calculated, and classification is again performed with the calculated average as the center of a new cluster. Clustering is realized by repeatedly performing this series of operations.

Here, for example, the cosine distances of the above 15280-1, 15281-1 and 15280-33 are as follows.

$$\text{Cosine}(15280\text{-}1, 15280\text{-}33) = 0/(\sqrt{5} \cdot \sqrt{4}) = 0$$

$$\text{Cosine}(15280\text{-}1, 15281\text{-}1) = 3/(\sqrt{5} \cdot \sqrt{3}) = 0.77$$

Assuming that, at this time, the center of a cluster has been allocated to 15280-1, the degree of similarity between 15280-1 and 15281-1 is high, so these two segments are distributed to the same cluster. On the other hand, the degree of similarity between 15280-1 and 15280-33 is 0, so these two segments are not distributed to the same cluster. In this example, segments with a high degree of similarity ultimately end up in the same cluster even when classification is repeated again, with 15280-1 and 15281-1 being determined to be in same cluster, that is, heterogeneous segments.
Related Matters Also, in Working Example 1, homogeneous segments can also be specified based on phase, for example, in the case where the texts in the first text set have a common phase. For example, clues as to the common phase of each text set is derived with a technique disclosed in the following Reference Document 1, and texts are segmented at places corresponding to this clues. Segments that are included in a common phase are viewed as similar segments, and the segments included in a common phase are determined to be homogeneous segments.

Reference Document 1

R. Shourya and L. V. Subramaniam, "Automatic Generation of Domain Models for Call-Centers from Noisy Transcriptions", in Proceedings of the 21$^{st}$ International Conference on Computational Linguistics and the 44th annual meeting of the Association for Computational Linguistics, pp. 737-755, 2006.

This allows a table showing homogeneous segments to be created, such as shown in FIG. 14, for example. In FIG. 14, segments on the same line are homogeneous segments. FIG. 14 is a diagram showing an example of homogeneous segment determination results in Working Example 1.
Step A3: Determination of Same Content Description Next, in Working Example 1, the inclusion determination unit 32 determines, with respect to each segment in an analysis target text and segments determined in step A2 to be homogeneous with the segment, whether the same content is described in corresponding texts in the second text set.

For example, the case where the analysis target text is a phone call speech recognition result shown in FIG. 10 (Receipt ID=15280) will be described. In this case, it is determined, targeting homogeneous segments (in FIG. 14, segments on the same line) of each segment (ID=15280-1, 15280-2, 15280-3, . . . ) in the analysis target text, whether the content thereof is described in corresponding second texts.
Determination using Alignment Technique The determination of whether the content of a given segment is described in a corresponding text can be realized by using a conventional alignment technique disclosed in the abovementioned Non-patent Document 1, for example. Specifically, the determination of whether the content of a segment (ID=15280-1) of a first text is described in a second text can be realized by setting the phone call speech recognition results (ID-15280) and the customer memos (ID-15280) as inputs of the above alignment technique.
Determination using Mutual Information Also, in Working Example 1, rather than going as far as to align the segments and determine which segment of a corresponding text in the second text set each segment corresponds to, a configuration may be adopted in which it is only determined whether the content of each segment is described in a corresponding text in the second text set.

Alternatively, the determination of whether the content of a given segment in the first text set is described in a corresponding text in the second text set can also be performed based on mutual information. This determination can be realized by basing the determination on mutual information, such as with a difference generation technique using co-occurrence relations described in the following Reference Document 2.

Reference Document 2

Akihiro Tamura, Kai Ishikawa, Shinichi Ando, "Using Differential Text Mining to Analyze Speech Dialogues and Call-memos in a Call Center", FIT2008, 2008.

Here, processing using mutual information will be described using a case example in which it is determined that the segment 15280-35 "It could be that you have a paper jam." (Osoraku kami ga tsumatteru no ka to.) shown in FIG. 10 is described in the customer memo 15280. Firstly, morphological analysis is performed on all customer memos (FIG. 11) and all phone call speech recognition results (FIG. 10), and only independent words are extracted, as shown in FIG. 15. FIG. 15 is a diagram showing an example of the result of morphologically analyzing a first text and a second text corresponding thereto.

Next, mutual information I (v; w) relating to the occurrence of a word v in the phone call speech recognition results and a word w in the customer memos is computed using the following Equation 1. In the following Equation 1, D represents a set of phone call speech recognition results, M represents a set of customer memos, x represents a random variable relating to the occurrence of v in Di, and y represents a random variable relating to the occurrence of w in $M_i$.

$$I(v; w) = \sum_{x \in \{v \in D, v \notin D\}} \sum_{y \in \{w \in M, w \notin M\}} p(x, y) \log \frac{P(x, y)}{P(x)P(y)} \quad \text{Equation 1}$$

As a result, mutual information between all words in the phone call speech recognition results and all words in the customer memos is obtained, as shown in FIG. 16. FIG. 16 is a diagram showing an example of mutual information computed in Working Example 1. Also, mutual information, by definition, tends to be higher the closer the resemblance between co-occurrence patterns. Therefore, the size of mutual information can be viewed as indirectly representing the similarly of the meaning of two words, since the co-occurrence patterns of words that have the same meaning will resemble each other.

Thereafter, a score representing the degree to which an arbitrary segment $Seg_{k\_}D_i$ included in the phone call speech recognition results is written in a corresponding customer memo $M_i$ is calculated using the following Equation 2. If this score is greater than or equal to a predetermined threshold, it is determined that $Seg_{k\_}D_i$ is written in $M_i$.

$$Score(Seg_{k\_}D_i, M_i) = \sum_{v \in seg_{k\_}D_i} \sum_{e \in M_i^N} I(v; w) \quad \text{Equation 2}$$

In the above Equation 2, $M_i^N$ denotes the top N number of word sets in descending order of I (v, w) relative to v. For example, N is set to 3. Assume that the resultant score (phone call speech 15280-35, customer memo 15280) is 0.785. At this time, it is determined that the phone call speech 15280-35 is written in the customer memo 15280, assuming a situation in which the threshold is 0.5. Note that the threshold in this case preferably is preset using supervised data obtained from artificially generated texts, preliminary experiments using artificially generated texts, or the like, for example.

A table showing whether the content of each segment is described in a corresponding text in the second text set can thus be obtained, as shown in FIG. 17, for example. FIG. 17 is a diagram showing an example of determination results as to whether the content of segments is described in second texts.

Step A4: Calculation of Degree of Association

Next, in Working Example 1, the descriptive content determination unit 33 calculates the degree of association, based the determination result of step A3. The degree of association indicates the degree to which the content of each segment in the analysis target text is content that should be described in a corresponding second text in the second text set. Also, as described above, in step A3, it is determined whether the content of each segment in the analysis target text is described in the second text, and whether the content of a homogeneous segment of each segment in the analysis target text is described in a corresponding text in the second text set.

For example, a degree of association $Cor(Seg_i)$ of a given segment $Seg_i$ with respect to a second text can be derived by the following Equation 3. In the following Equation 3, the second item indicates the extent to which the content of homogeneous segments ($Seg_j$) of a segment ($Seg_i$) are included in corresponding texts in the second text set. Specifically, the frequency or the percentage at which the content of homogeneous segments of the segment ($Seg_i$) is described in corresponding second texts is shown.

$$Cor(Seg_i) = a \cdot cont(Seg_i) + b \cdot \sum_{Seg_j \in Cluster(Seg_i)} cont(Seg_j)/N \quad \text{Equation 3}$$

In Equation 3, a and b are positive numbers. The method of setting a and b will be discussed later. Also, in the above Equation 3, $cont(Seg_i)$ represents the determination result of the abovementioned step A3 with respect to $Seg_i$; that is, whether the content of $Seg_i$ is described in a corresponding text in the second text set. Specifically, $cont(Seg_i)$ will, for example, be "1" in the case where the content of the segment is described in a corresponding text in the second text set, and "0" in the case where the content of the segment is not described.

Also, in the above Equation 3, $Cluster(Seg_i)$ represents the set of homogeneous segments of $Seg_i$ derived at step A2. In other words, $Cluster(Seg_i)$ represents the set of segments on the same line as $Seg_i$, in FIG. 14. N is the number of elements in $Cluster(Seg_i)$ (step A4).

Thereafter, based on the degree of association of the segments calculated at the abovementioned step A4, the descriptive content determination unit 33 specifies, among the segments of the analysis target text, segments that should be described in the second text, such as the example (receipt ID=15280) shown in FIG. 18, for example. FIG. 18 is a diagram showing an example of segments that it has been determined should be described in a customer memo in Working Example 1.

Specifically, segments whose degree of association is greater than or equal to a threshold θ are specified, and it is determined that the content of these segments should be described in the second text (step A5).

Here, the method of setting the variables a and b and the threshold θ will be described. These values can, for example, be predetermined empirically by preliminary experiments utilizing supervised data, or the like. In preliminary experiments, the results of determining manually, with respect to a portion of the segments in the first text set, whether the content of the segments should be described in the corresponding second text are assigned in advance to those segments, for example. The initial values of a, b and θ are then set randomly.

Next, the degree of association is derived using Equation 3, targeting the segments in the first text set to which the manual determination results were assigned, and it is determined that segments whose degree of association is greater than or equal to the threshold θ set as described above are segments that should be described in a second text. These determination results are compared with the manually assigned solutions, and an accuracy rate is derived. Next, the values of a, b and θ are changed, and a series of processes consisting of computation and comparison of the abovementioned degrees of association is carried out a plurality of times. The values of a, b and θ having the highest accuracy rate are then employed.

Thereafter, the descriptive content determination unit 33 is also capable of outputting only the text portions of segments whose content it has been determined should be described in the second text, or outputting the text portions together with the degrees of association, as shown in FIG. 18. The descriptive content determination unit 33 is also able to output a table ranking the segments in order of the degrees of association.

It is clear from FIG. 18 that a segment ID=34 is included in a segment that is determined to be a segment whose content should be described in a second text. The content of this segment is not described in the second text (receipt ID=15280), but is information that should be written as a second text. Such information would not, in Patent Document 1 or Non-patent Document 1, be determined at information that should be written as a second text. In contrast, in the present working example, information on a homogeneous segment of the segment is used by the second item of the above Equation 3, when calculating the degree of association of segments. According to the present working example, the segment is thus determined to be information that should be written to the second text.

Working Example 2

Next, a specific working example of the text processing apparatus and the text processing method in Embodiment 2 will be described, with reference to FIGS. 19 to 22. Hereinafter, the operation of the text processing apparatus in Embodiment 2 will be described according to the flowchart shown in FIG. 5. Note that FIG. 4 will also be appropriately taken into consideration.

In Working Example 2, similarly to Working Example 1, the first text set is, as shown in FIG. 19, a set of speech recognition texts obtained by performing speech recognition on phone call speech in a call center. The second text set is, as shown in FIG. 20, a set of customer memos for calls serving as the recognition source of the speech recognition text set shown in FIG. 19. In Working Example 2, similarly to Working Example 1, portions that should be written in the inquiry content of a customer memo are determined within each text in the speech recognition text set. FIG. 19 is a diagram showing an example of speech recognition texts used in Working Example 2. FIG. 20 is a diagram showing an example of a customer memo set used in Working Example 2.

Step B1: Input Reception Process

The input reception unit 134 receives a set of speech recognition result texts of phone call speech as a first text set, and a set of customer memos corresponding to the speech recognition results as a second text set. The input reception unit 134 also receives specification of a first text that will be targeted for analysis from the first text set (step B1). At this time, each text in the first text set and the second text set that serve as inputs does not necessary need to have been segmented into segments serving as analysis units, as shown in FIG. 19 and FIG. 20.

Step B2: Setting of Segments

Next, the text segmentation unit 135 segments each text in the first text set and the second text set into segments that serve as analysis units (step B2). For example, in the case of the segments that will serve as analysis units being sentences, the text segmentation unit 135 predetermines sentence separators and performs segmentation such that a block between separators is set as a single segment. In FIG. 19 and FIG. 20, periods "." and question marks "?" are predetermined as separators, and the results shown in FIG. 10 and FIG. 11 are obtained as a result of performing text segmentation on the texts shown in FIG. 19 and FIG. 20.

The text segmentation unit 135 is also able to segment a text and set segments based on topic. In this case, the text segmentation unit 135 realizes text segmentation by using a technique for determining the position where the subject changes using word frequency or distribution (see Reference Document 3 below), for example. Specifically, when the example of receipt ID=15280 shown in FIG. 19 is segmented based on topic, the result will be as shown in FIG. 21, for example. FIG. 21 is a diagram showing an example of phone call speech recognition results segmented by topic in Working Example 2.

Reference Document 3

Marti A. Hearst, "TextTiling: Segmenting Text into Multi-paragraph Subtopic Passages", Computational Linguistics, Vol. 23 No. 1, pp. 33-64, 1997.

Alternatively, the text segmentation unit 135, in the case where there are common phases in the texts of the text sets, is able to derive clues as to these phases by a technique disclosed in the following Reference Document 4, for example, and segment the texts at places corresponding to these clues. In this case, the segments of a text can be segmented by units called subject phases. Specifically, when the example of receipt ID=15280 shown in FIG. 19 is segmented based on subject phase, the result will be as shown in FIG. 22, for example. FIG. 22 is a diagram showing an example of phone call speech recognition results segmented by phase in Working Example 2.

Reference Document 4

R. Shourya and L. V. Subramaniam, "Automatic Generation of Domain Models for Call-Centers from Noisy Transcriptions", in Proceedings of the 21st International Conference on Computational Linguistics and the 44th annual meeting of the Association for Computational Linguistics, pp. 737-755, 2006.

In Working Example 2, the text segmentation unit 135 may also segment texts and set segments based on other criteria. The above examples of criteria for segment setting are not limiting.

After the execution of step B2, steps B3 to B6 shown in FIG. 5 are executed on the segmented first text set and second text set. Steps B3 to B6 are, however, performed by processing similar to steps A2 to A5 in Working Example 1.

According to Working Example 2, segments that are effective in utilizing information on homogeneous segments are set according to data, irrespective of whether texts in the input first text set and second text set have been segmented into segments serving as analysis units. Accordingly, the accuracy of the final output also improves, since processing is performed in suitable segment units.

Working Example 3

Next, a specific working example of the text processing apparatus and the text processing method in Embodiment 3 will be described, with reference to FIG. 23. Hereinafter, the operation of the text processing apparatus in Embodiment 3 will be described according to the flowchart shown in FIG. 7. Note that FIG. 6 will also be appropriately taken into consideration.

In Working Example 3, similarly to Working Example 1, the first text set is a set of speech recognition texts obtained by performing speech recognition on phone call speech in a call center. Also, the second text set is a set of customer memos for calls serving as the recognition source of the speech recognition text set. In Working Example 3, similarly to Working Example 1, portions to be written in the inquiry content of a customer memo are determined within each text in the speech recognition text set.

Step C1: Input Reception Process

The input reception unit 234 performs similar processing to the processing in step A1 mentioned in Working Example 1 (step C1).

Step C2: Determination of Same Content Description

Next, in Working Example 3, the inclusion determination unit 232 determines, with respect to all segments of the texts in the first text set, whether the content is described in a corresponding text in the second text set.

The only difference between step A3 of Working Example 1 and this step C2 is that in step A3 of Working Example 1 the input target segment is limited, whereas in step C2 all segments in the first text set are targeted. Accordingly, as for the determination technique in step C2, a similar technique to step A3 of Working Example 1 can be used. Also, as for the output of step C2, similar results to the examples shown in FIG. 17 that are obtained at step A3 of Working Example 1 are obtained (step C2).

Step C3: Specification of Homogeneous Segments

Next, the homogeneous segment specification unit 231 specifies a homogeneous segment of each segment in the analysis target text, from the set of segments whose content is determined by the abovementioned step C2 to be described in corresponding texts in the second text set. Note that examples of segments determined to be described at step C2 include segments for which a "Same content description" field is marked with a circle "○" in a table having the same format as the table shown in FIG. 17.

Also, in Working Example 3, an example of a specific technique for determining whether two segments are in a homogeneous segment relationship includes the determination technique involving morphological analysis, word vector generation and clustering mentioned in step A2 of Working Example 1. As a result of step C3 in Working Example 3, a table in which each segment in the analysis target text and homogeneous segments of the segment are on the same line is obtained, as shown in FIG. 23, for example (step C3). FIG. 23 is a diagram showing an example of homogeneous segment determination results in Working Example 3.

Step C4: Calculation of Degree of Association

Next, in Working Example 3, the descriptive content determination unit 233 calculates the degree of association, based the results of steps C2 and C3. The degree of association indicates, with respect to each segment in the analysis target text, the degree to which the content of the segment is content that should be described in a second text. Also, as a result of steps C2 and C3, it is determined whether the content of each segment in the analysis target text is described in a second text, and to what extent there exist, among the homogeneous segments, segments whose content is described in a corresponding text in the second text set.

Specifically, a degree of association $Cor(Seg_i)$ of a given segment $Seg_i$ with respect to a second text is derived by the following Equation 4, for example. In the following Equation 4, the second item indicates the extent to which the content of homogeneous segments ($Seg_j$) of a segment ($Seg_i$) are included in corresponding texts in the second text set.

$$Cor(Seg_i) = a \cdot cont(Seg_i) + b \cdot \sum_{Seg_j \in Cluster(Seg_i)} cont(Seg_j) \quad \text{Equation 4}$$

In Equation 4, a and b are positive numbers. a and b are, similarly to the case of Working Example 1, preset empirically by preliminary experiments utilizing supervised data, for example. $cont(Seg_i)$ represents the determination result of step C2 with respect to $Seg_i$, that is, whether the content of $Seg_i$ is described in a corresponding text in the second text set. Specifically, $cont(Seg_i)$ will, for example, be "1" in the case where the content of the segment is described in a corresponding text in the second text set, and "0" in the case where the content of the segment is not described.

Also, in Equation 4, $Cluster(Seg_i)$ represents the set of homogeneous segments of $Seg_i$. In other words, $Cluster(Seg_i)$ represents the set of segments on the same line as $Seg_i$, in FIG. 23 (step C4).

Thereafter, the descriptive content determination unit 233 operates similarly to step A5 in Working Example 1 (step C5). As a result, segments that should be described in a second text are specified, among the segments of the analysis target text.

Here, in Working Example 3, similarly to Working Example 2, texts may be segmented by a text segmentation unit. In this case, step B2 of Working Example 2 is implemented between step C1 and step C2. This enables sets of texts for which segments serving as analysis units have not been set, as shown in FIG. 19 and FIG. 20, to also be received as a first text set and a second text set in Working Example 3.

Working Example 4

Next, a specific working example of the text processing apparatus and the text processing method in Embodiment 4 will be described, with reference to FIG. 24. Hereinafter, the operation of the text processing apparatus in Embodiment 4 will be described according to the flowchart shown in FIG. 8.

In Working Example 4, similarly to Working Example 1, the first text set is a set of speech recognition texts obtained by performing speech recognition on phone call speech in a call center. Also, the second text set is a set of customer memos for calls serving as the recognition source of the speech recognition text set. In Working Example 4, similarly to Working Example 1, portions to be written in the inquiry content of a customer memo are determined within each text in the speech recognition text set.

Step D1: Input Reception Process

The input reception unit performs similar processing to the processing in step A1 mentioned in Working Example 1 (step D1).

Step D2: Calculation of Similarity Score

Next, in Working Example 4, the homogeneous segment specification unit calculates a similarity score representing a degree of similarity to each segment of the analysis target text, targeting all segments in the first text set, and assigns a similarity score to each segment. This similarity score indicates the extent to which two segments are the same.

Specifically, in Working Example 4, similarly to step A2 of Working Example 1, morphological analysis is performed on each segment, and vectors are generated in which a single morpheme corresponds to a single dimension, and the total number of morphemes represents the number of dimensions. In other words, word vectors are generated in which elements corresponding to a morpheme in a segment are 1, and elements corresponding to a morpheme that is not included in a segment are 0 (see FIG. 13). In Working Example 4, the cosine distance between two word vectors thus generated is assigned to each segment as a similarity score.

As a result of the above processing, a matrix is obtained in which an (i, j) component indicates the similarity score of a segment i and a segment j, as shown in FIG. 24, for example (step D2). FIG. 24 is a diagram showing an example of similarity scores calculated in Working Example 4.

Step D3: Specification of Homogeneous Segments

Next, the homogeneous segment specification unit specifies, from among all segments in the first text set excluding the analysis target text, a homogeneous segment of each segment in the analysis target text, based on the similarity score derived at step D2.

In Working Example 4, if the similarity score in each cell in FIG. 24 is greater than or equal to a threshold, for example, the homogeneous segment specification unit is able to determine that segments corresponding to the row and column of that score are the same type of segment. The threshold in this case can be predetermined empirically by preliminary experiments utilizing supervised data, for example, as also mentioned in Working Example 1 (step D3).

Step D4: Determination of Same Content Description

Next, in Working Example 4, the inclusion determination unit performs similar processing to step A3 in Working Example 1. As a result of this operation, it is determined, with respect to each segment in the analysis target text and a homogeneous segment of the segment, whether the content is described in a corresponding text in the second text set. A table showing the determination results such as shown in FIG. 17 can then be obtained (step D4).

Step D5: Calculation of Degree of Association

Next, in Working Example 4, the descriptive content determination unit 33 calculates the degree of association, based on the result of step D4 and the similarity score derived at step D2. The degree of association indicates the degree to which the content of each segment of the analysis target text is content that should be described in a second text. Also, the determination result of step D4 indicates whether the content of the segment is described in a second text, and whether the content of a homogeneous segment of the segment is described in a corresponding text in the second text set.

A degree of association $Cor(Seg_i)$ of a given segment $Seg_i$ with respect to a second text is derived by the following Equation 5, for example. In the following Equation 5, the second item indicates the extent to which the content of homogeneous segments $(Seg_j)$ of a segment $(Seg_i)$ are included in corresponding texts in the second text set.

$$Cor(Seg_i) = a \cdot cont(Seg_i) + \qquad \text{Equation 5}$$
$$b \cdot \sum_{Seg_j \in Cluster(Seg_i)} sim(Seg_i, Seg_j) \cdot cont(Seg_j) / N$$

In Equation 5, a and b are positive numbers. a and b are, similarly to the case of Working Example 1, preset empirically by preliminary experiments utilizing supervised data, for example. Also, $cont(Seg_i)$ represents whether the content of $Seg_i$ is described in a corresponding text in the second text set. Specifically, $cont(Seg_i)$ will, for example, be "1" in the case where the content of $Seg_i$ is described in a corresponding text in the second text set, and "0" in the case where the content of the segment is not described.

Also, in Equation 5, $Cluster(Seg_i)$ is the set of homogeneous segments of $Seg_i$, and is obtained by step D3. N is the number of elements in $Cluster(Seg_i)$. Further, in Equation 5, $sim(Seg_i, Seg_j)$ is the similarity score between $Seg_i$ and $Seg_j$, and is calculated at step D2. In the present example, this is given by the value of the (i, j) component in FIG. 24 (step D5).

Thereafter, the descriptive content determination unit operates similarly to step A5 in Working Example 1 (step D5). As a result, segments that should be described in a second text are specified, among the segments of the analysis target text.

As described above, in Working Example 4, $sim(Seg_i, Seg_j)$ is used, as shown in the above Equation 5, when calculating the degree of association of segments in step D5. This results in the final output also being highly accurate, since information indicating whether $Seg_i$ and $Seg_j$ are homogeneous segments is more detailed in comparison to Working Example 1.

Here, step B3 in Working Example 2 can be replaced by steps D2 and D3 of Working Example 4, and a matrix can be obtained in which each component represents a similarity score between segments, as shown in FIG. 24. Further, in this case, step B5 in Working Example 2 may be replaced by step D5, and the degree of association may be calculated using the above equation 5 by substituting in the similarity score between segments obtained from FIG. 24. This allows similar effects to Working Example 4 to also be obtained in Working Example 2.

Also, in step C4 of Working Example 3, the following Equation 6, which uses $sim(Seg_i, Seg_j)$, can be used when calculating the degree of association of segments, as with step D4 of Working Example 4. In this case, effects similar to Working Example 4 are also obtained in Working Example 3. Note that in the following Equation 6, the definitions of variables are the same as the above Equation 5. Also, in the following Equation 6, the second item indicates the degree to which homogeneous segments $(Seg_j)$ of a segment $(Seg_i)$ are described in corresponding texts in the second text set.

$$Cor(Seg_i) = \qquad \text{Equation 6}$$
$$a \cdot cont(Seg_i) + b \cdot \sum_{Seg_j \in Cluster(Seg_i)} sim(Seg_i, Seg_j) \cdot cont(Seg_j)$$

Specifically, a similar step to step D2 is performed after step C3 of Embodiment 3, and the similarity score between each segment of the analysis target text and a segment determined by step C3 to be a homogeneous segment of the segment is saved. As a result, a matrix, similar to FIG. 24, for example, whose rows are constituted by segments in the analysis target text and whose columns are constituted by segments determined by step C3 to be homogeneous segments is generated. Thereafter, in step C4 of Working Example 3, the degree of association is calculated using the above Equation 6, instead of the above Equation 4.

Working Example 5

Next, a specific working example of the text processing apparatus and the text processing method in Embodiment 5 will be described, with reference to FIG. 25. Hereinafter, the operation of the text processing apparatus in Embodiment 5 will be described according to the flowchart shown in FIG. 9.

In Working Example 5, similarly to Working Example 1, the first text set is a set of speech recognition texts obtained by performing speech recognition on phone call speech in a call center. Also, the second text set is a set of customer memos for calls serving as the recognition source of the speech recognition text set. In Working Example 5, similarly to Working Example 1, portions to be written in the inquiry content of a customer memo are determined within each text in the speech recognition text set.

Step E1: Input Reception Process

The input reception unit performs similar processing to the processing in step A1 mentioned in Working Example 1 (step E1).

Step E2: Specification of Homogeneous Segments

Next, in Working Example 5, the homogeneous segment specification unit specifies homogeneous segments similar to segments in the analysis target text, targeting all segments in the first text set, similarly to step A2 in Working Example 1. Specifically, the homogeneous segment specification unit specifies a homogeneous segment of each segment in the analysis target text, among all segments in the first text set. Results such as FIG. 14, for example, are obtained as a result (step E2).

Step E3: Calculation of Inclusion Score

Next, in Working Example 5, the inclusion determination unit determines, with respect to each segment in the analysis target text and the homogeneous segment specified in step E2, whether the same content is described in a corresponding text in the second text set. The inclusion determination unit also calculates, for these segments, an inclusion score representing the possibility of the same content being described.

Incidentally, in Patent Document 1 and Non-patent Document 1 mentioned in the Background Art, an alignment score for two segments (score representing that two segments are more closely aligned the higher the value) is calculated and alignment is executed.

In Working Example 5, the above alignment score is viewed as an inclusion score representing the possibility of the content of a segment being described in a corresponding text in the second text set, and this score is saved (step E3). As a result of this processing, a table showing the possibility of each segment being described in a second text is obtained, as shown in FIG. 25, for example. FIG. 25 is a diagram showing an example of inclusion scores calculated in Working Example 5.

An inclusion score can also be computed based on mutual information, such as with the difference generation technique using co-occurrence relations described in the abovementioned Reference Document 2. In this case, if it is determined that the content of a segment is described in a corresponding text in the second text set, the sum of the mutual information of each word in the segment and each word in the corresponding text in the second text set is viewed as the inclusion score (step E3).

Step E4: Calculation of Degree of Association

Next, in Working Example 5, the descriptive content determination unit calculates the degree of association, based on the inclusion score calculated at step E3. The degree of association indicates the degree to which the content of each segment of the analysis target text is content that should be described in a second text. The inclusion scores calculated at step E3 are an inclusion score representing the possibility of the content of the segment being described in a second text, and an inclusion score representing the possibility of the content of a homogeneous segment of the segment being described in a corresponding text in the second text set.

For example, a degree of association $Cor(Seg_i)$ of a given segment $Seg_i$ with respect to a second text is derived by the following Equation 7. In the following Equation 7, the second item indicates the extent to which the content of homogeneous segments $(Seg_j)$ of a segment $(Seg_i)$ are included in corresponding texts in the second text set.

$$Cor(Seg_i) = a \cdot \text{score\_cont}(Seg_i) + b \cdot \sum_{Seg_j \in Cluster(Seg_i)} \text{score\_cont}(Seg_j)/N \quad \text{Equation 7}$$

In the above Equation 7, a and b are positive numbers. a and b are, similarly to the case of Working Example 1, preset empirically by preliminary experiments utilizing supervised data, for example. Also, $\text{score\_cont}(Seg_i)$ is the inclusion score obtained for $Seg_i$ at step E3. Further, $Cluster(Seg_i)$ is the set of homogeneous segments of $Seg_i$, and is obtained by step E2. N is the number of elements in $Cluster(Seg_i)$ (step E4).

Thereafter, the descriptive content determination unit operates similarly to step A5 in Working Example 1 (step E5). As a result, segments that should be described in a second text are specified, among the segments of the analysis target text.

As described above, in Working Example 5, $\text{score\_cont}(Seg_i)$ indicating the inclusion score of a segment is used, as with the above Equation 7, when calculating the degree of association of segments in step E4. This results in information indicating whether the content of $Seg_i$ is described in a corresponding text in the second text set being more stringent than Working Example 1. The final output will thus also be highly accurate.

Here, in Working Example 2, step B4 can be replaced by step E3 of Working Example 5, and an inclusion score for each segment, as shown in FIG. 25, can be obtained. Further, in this case, step B5 of Working Example 2 may be replaced by step E4, and the degree of association may be calculated using the inclusion score. This allows similar effects to Working Example 5 to also be obtained in Working Example 2.

Also, in step C4 of Working Example 3, the following Equation 8, which uses the inclusion score of each segment, can be used when calculating the degree of association of segments, as with step E4 of Working Example 5. In this case, effects similar to Working Example 5 are also obtained in Working Example 3. Note that in the following Equation 8, the definitions of variables are the same as the above Equation 7. Also, in the following Equation 8, the second item indicates the degree to which homogeneous segments $(Seg_j)$ of a segment $(Seg_i)$ are described in corresponding texts in the second text set.

$$Cor(Seg_i) = a \cdot \text{score\_cont}(Seg_i) + b \cdot \sum_{Seg_j \in Cluster(Seg_i)} \text{score\_cont}(Seg_j) \quad \text{Equation 8}$$

Specifically, at step C2 of Working Example 3, an inclusion score is calculated and saved together with the determination result, when determining, with respect to all segments in the first text set, whether the content is described in a corresponding second text. Note that the calculation of the inclusion score is performed by similar processing to step E3 of Working Example 5. As a result, a table having the same format as the table shown in FIG. 25 is obtained in which inclusion scores for all segments are stored. In step C4 of Working Example 3, the above Equation 8 is then used to calculate the degree of association, instead of the above Equation 4.

Also, in Working Example 4, step D4 can be replaced by step E3 of Working Example 5, and an inclusion score for each segment, as shown in FIG. 25, can be obtained. In this case, in step D5, the following Equation 9 that includes the inclusion score of each segment can be used, when calculating the degree of association of segments. This allows similar effects to Working Example 5 to also be obtained in Working Example 4. Also, in the following Equation 9, the second item indicates the degree to which the content of homogeneous segments $(Seg_j)$ of a segment $(Seg_i)$ are included in corresponding texts in the second text set.

$$Cor(Seg_i) = a \cdot \text{score\_cont}(Seg_i) + b \cdot \sum_{Seg_j \in Cluster(Seg_i)} sim(Seg_i, Seg_j) \cdot \text{score\_cont}(Seg_j)/N \quad \text{Equation 9}$$

Here, a, b, sim($Seg_j$, $Seg_i$), Cluster($Seg_i$) and N are similar to the variables in the above Equation 6 shown in Working Example 4. Also, score_cont($Seg_i$) is the inclusion score obtained for $Seg_i$ at step E3.

Hereinabove, the invention was described with reference to embodiments and working examples, but the invention is not limited to the above embodiments or working examples. The configurations and details of the invention can be modified within the scope of the invention that a person skilled in the art would understand.

The text processing apparatus, text processing method, and computer-readable recording medium of the invention have the following features.

(1) The text processing apparatus performs an analysis process by contrasting a first text set constituted by first texts and a second text set constituted by second texts corresponding to the first texts, the first texts and the second texts corresponding thereto being generated around a same event through mutually different generation processes, the text processing apparatus including a segment determination unit, and a descriptive content determination unit, the segment determination unit determining, with respect to a homogeneous segment that is similar to a plurality of segments constituting a first text which is set as an analysis target and that is included in another first text, whether a content thereof is included in the second texts, and the descriptive content determination unit determining, based on a result of the determination by the segment determination unit, whether each segment constituting the first text which is set as the analysis target should be described in the second text corresponding to the first text which is set as the analysis target.

(2) In the text processing apparatus according to (1) above, the segment determination unit includes a homogeneous segment specification unit and an inclusion determination unit, the homogeneous segment specification unit, by contrasting each of the plurality of segments constituting the first text which is set as the analysis target and the other first text, specifying a segment similar to any of the plurality of segments constituting the first text which is set as the analysis target, from a plurality of segments constituting the other first text, and setting the specified segment as a homogeneous segment, and the inclusion determination unit determining whether the content of the homogeneous segment is included in the second text corresponding to the other first text which includes the homogeneous segment.

(3) In the text processing apparatus according to (2) above, the descriptive content determination unit derives, based on the result of the determination by the segment determination unit, an extent to which the content of the homogeneous segment is included in the second text corresponding to the other first text which includes the homogeneous segment, further derives, based on the derived extent, a degree to which each segment constituting the first text which is set as the analysis target should be described in the second text corresponding to the first text which is set as the analysis target, and performs the determination using the degree.

(4) In the text processing apparatus according to (3) above, the inclusion determination unit, in addition to the determination regarding the content of the homogeneous segment, computes, for each of the plurality of segments constituting the first text which is set as the analysis target and for the homogeneous segment, an inclusion score representing a possibility of a content of the segment being included in the second text corresponding to the first text which includes the segment, and the descriptive content determination unit further derives the degree using the inclusion score computed by the inclusion determination unit, such that the degree increase the higher the inclusion score.

(5) In the text processing apparatus according to (1) above, the segment determination unit includes an inclusion determination unit and a homogeneous segment specification unit, the inclusion determination unit determining, for the plurality of segments respectively constituting all of the first texts, whether a content of each segment is included in the second text corresponding to the first text which includes the segment, and the homogeneous segment specification unit, by contrasting each of the plurality of segments constituting the first text which is set as the analysis target and a segment that is determined by the inclusion determination unit to be included in the second text and that is included in another first text, specifying a segment similar to any of the plurality of segments constituting the first text which is set as the analysis target, and setting the specified segment as a homogeneous segment.

(6) In the text processing apparatus according to (5) above, the descriptive content determination unit derives, based on the result of the determination by the segment determination unit, an extent to which the content of the homogeneous segment is included in the second text corresponding to the other first text which includes the homogeneous segment, further derives, based on the derived extent, a degree to which each segment constituting the first text which is set as the analysis target should be described in the second text corresponding to the first text which is set as the analysis target, and performs the determination using the degree.

(7) In the text processing apparatus according to (6) above, the inclusion determination unit, in addition to the determination regarding the content of each segment, computes, for the plurality of segments respectively constituting all of the first texts, an inclusion score representing a possibility of the content of each segment being included in the second text corresponding to the first text which includes the segment, and the descriptive content determination unit further derives the degree using the inclusion score computed by the inclusion determination unit, such that the degree increase the higher the inclusion score.

(8) In the text processing apparatus according to (3) above, the descriptive content determination unit derives, as the extent of inclusion in the second text, a percentage at which the content of the homogeneous segment is described in the second text corresponding to the other first text which includes the homogeneous segment, further derives a degree to which each segment constituting the first text which is set as the analysis target should be described in the second text corresponding to the first text which is set as the analysis target, such that the degree increases the higher the percentage, and performs the determination using the derived degree.

(9) In the text processing apparatus according to (3) above, the descriptive content determination unit derives, as the extent of inclusion in the second text, a frequency at which the content of the homogeneous segment is described in the second text corresponding to the other first text which includes the homogeneous segment, further derives a degree to which each segment constituting the first text which is set as the analysis target should be described in the second text corresponding to the first text which is set as the analysis target, such that the degree increases the higher the frequency, and performs the determination using the derived degree.

(10) In the text processing apparatus according to (8) above, the homogeneous segment specification unit, in addition to the specification of the homogeneous segment, computes a similarity score representing an extent of similarity between each of the plurality of segments constituting the first text which is set as the analysis target and the homogeneous segment, and the descriptive content determination unit further derives the degree such that the degree increases the higher the similarity score computed by the homogeneous segment specification unit.

(11) The text processing apparatus according to (1) above, further includes a text segmentation unit that segments the first texts based on at least one of a sentence, a paragraph, a topic and a phase included therein, and sets the plurality of segments.

(12) In the text processing apparatus according to (1) above, setting of the plurality of segments constituting the first texts is performed based on at least one of a sentence, a paragraph, a topic and a phase included in the first text.

(13) The text processing method involves performing an analysis process by contrasting a first text set constituted by first texts and a second text set constituted by second texts corresponding to the first texts, the first texts and the second texts corresponding thereto being generated around a same event through mutually different generation processes, the text processing method including the steps of (a) determining, with respect to a homogeneous segment that is similar to a plurality of segments constituting a first text which is set as an analysis target and that is included in another first text, whether a content thereof is included in the second texts, and (b) determining, based on a result of the determination in the (a) step, whether each segment constituting the first text which is set as the analysis target should be described in the second text corresponding to the first text which is set as the analysis target.

(14) In the text processing method according to (13) above, the (a) step includes the steps of (l) specifying, by contrasting each of the plurality of segments constituting the first text which is set as the analysis target and the other first text, a segment similar to any of the plurality of segments constituting the first text which is set as the analysis target, from a plurality of segments constituting the other first text, and setting the specified segment as a homogeneous segment, and (m) determining whether the content of the homogeneous segment is included in the second text corresponding to the other first text which includes the homogeneous segment.

(15) In the text processing method according to (14) above, the (b) step involves deriving, based on the result of the determination in the (a) step, an extent to which the content of the homogeneous segment is included in the second text corresponding to the other first text which includes the homogeneous segment, further deriving, based on the derived extent, a degree to which each segment constituting the first text which is set as the analysis target should be described in the second text corresponding to the first text which is set as the analysis target, and performing the determination using the degree.

(16) In the text processing method according to (15) above, the (m) step, in addition to the determination regarding the content of the homogeneous segment, involves computing, for each of the plurality of segments constituting the first text which is set as the analysis target and for the homogeneous segment, an inclusion score representing a possibility of a content of the segment being included in the second text corresponding to the first text which includes the segment, and the (b) step involves further deriving the degree using the inclusion score computed in the (m) step, such that the degree increase the higher the inclusion score.

(17) In the text processing method according to (13) above, the (a) step includes the steps of (x) determining, for the plurality of segments respectively constituting all of the first texts, whether a content of each segment is included in the second text corresponding to the first text which includes the segment, and (y) specifying, by contrasting each of the plurality of segments constituting the first text which is set as the analysis target and a segment that is determined in the (x) step to be included in the second text and that is included in another first text, a segment similar to any of the plurality of segments constituting the first text which is set as the analysis target, and setting the specified segment as a homogeneous segment.

(18) In the text processing method according to (17) above, the (b) step involves deriving, based on the result of the determination in the (a) step, an extent to which the content of the homogeneous segment is included in the second text corresponding to the other first text which includes the homogeneous segment, further deriving, based on the derived extent, a degree to which each segment constituting the first text which is set as the analysis target should be described in the second text corresponding to the first text which is set as the analysis target, and performing the determination using the degree.

(19) In the text processing method according to (18) above, the (x) step, in addition to the determination regarding the content of each segment, involves computing, for the plurality of segments respectively constituting all of the first texts, an inclusion score representing a possibility of the content of each segment being included in the second text corresponding to the first text which includes the segment, and the (b) step further involves deriving the degree using the inclusion score computed in the (x) step, such that the degree increase the higher the inclusion score.

(20) In the text processing method according to (15) above, the (b) step involves deriving, as the extent of inclusion in the second text, a percentage at which the content of the homogeneous segment is described in the second text corresponding to the other first text which includes the homogeneous segment, further deriving a degree to which each segment constituting the first text which is set as the analysis target should be described in the second text corresponding to the first text which is set as the analysis target, such that the degree increases the higher the percentage, and performing the determination using the derived degree.

(21) In the text processing method according to (15) above, the (b) step involves deriving, as the extent of inclusion in the second text, a frequency at which the content of the homogeneous segment is described in the second text corresponding to the other first text which includes the homogeneous segment, further deriving a degree to which each segment constituting the first text which is set as the analysis target should be described in the second text corresponding to the first text which is set as the analysis target, such that the degree increases the higher the frequency, and performing the determination using the derived degree.

(22) In the text processing method according to (20) above, the (l) step, in addition to the specification of the homogeneous segment, involves computing a similarity score representing an extent of similarity between each of the plurality of segments constituting the first text which is set as the analysis target and the homogeneous segment, and the (b) step involves further deriving the degree such that the degree increases the higher the similarity score computed in the (l) step.

(23) The text processing method according to (13) above, further includes the step of (c) segmenting the first texts based on at least one of a sentence, a paragraph, a topic and a phase included therein, and setting the plurality of segments.

(24) In the text processing method according to (13) above, setting of the plurality of segments constituting the first texts is performed based on at least one of a sentence, a paragraph, a topic and a phase included in the first text.

(25) The computer-readable recording medium has recorded thereon a program for causing a computer to execute an analysis process of contrasting a first text set constituted by first texts and a second text set constituted by second texts corresponding to the first texts, the first texts and the second texts corresponding thereto being generated around a same event through mutually different generation processes, the program recorded on the recording medium includes a command for causing the computer to execute the steps of (a) determining, with respect to a homogeneous segment that is similar to a plurality of segments constituting a first text which is set as an analysis target and that is included in another first text, whether a content thereof is included in the second texts, and (b) determining, based on a result of the determination in the (a) step, whether each segment constituting the first text which is set as the analysis target should be described in the second text corresponding to the first text which is set as the analysis target.

(26) In the computer-readable recording medium according to (25) above, the computer executes, as the (a) step, the steps of (l) specifying, by contrasting each of the plurality of segments constituting the first text which is set as the analysis target and the other first text, a segment similar to any of the plurality of segments constituting the first text which is set as the analysis target, from a plurality of segments constituting the other first text, and setting the specified segment as a homogeneous segment, and (m) determining whether the content of the homogeneous segment is included in the second text corresponding to the other first text which includes the homogeneous segment.

(27) In the computer-readable recording medium according to (26) above, the (b) step involves deriving, based on the result of the determination in the (a) step, an extent to which the content of the homogeneous segment is included in the second text corresponding to the other first text which includes the homogeneous segment, further deriving, based on the derived extent, a degree to which each segment constituting the first text which is set as the analysis target should be described in the second text corresponding to the first text which is set as the analysis target, and performing the determination using the degree.

(28) In the computer-readable recording medium according to (27) above, the (m) step, in addition to the determination regarding the content of the homogeneous segment, involves computing, for each of the plurality of segments constituting the first text which is set as the analysis target and for the homogeneous segment, an inclusion score representing a possibility of a content of the segment being included in the second text corresponding to the first text which includes the segment, and the (b) step involves further deriving the degree using the inclusion score computed in the (m) step, such that the degree increase the higher the inclusion score.

(29) In the computer-readable recording medium according to (25) above, the computer executes, as the (a) step, the steps of (x) determining, for the plurality of segments respectively constituting all of the first texts, whether a content of each segment is included in the second text corresponding to the first text which includes the segment, and (y) specifying, by contrasting each of the plurality of segments constituting the first text which is set as the analysis target and a segment that is determined in the (x) step to be included in the second text and that is included in another first text, a segment similar to any of the plurality of segments constituting the first text which is set as the analysis target, and setting the specified segment as a homogeneous segment.

(30) In the computer-readable recording medium according to (29) above, the (b) step involves deriving, based on the result of the determination in the (a) step, an extent to which the content of the homogeneous segment is included in the second text corresponding to the other first text which includes the homogeneous segment, further deriving, based on the derived extent, a degree to which each segment constituting the first text which is set as the analysis target should be described in the second text corresponding to the first text which is set as the analysis target, and performing the determination using the degree.

(31) In the computer-readable recording medium according to (30) above, the (x) step, in addition to the determination regarding the content of each segment, involves computing, for the plurality of segments respectively constituting all of the first texts, an inclusion score representing a possibility of the content of each segment being included in the second text corresponding to the first text which includes the segment, and the (b) step further involves deriving the degree using the inclusion score computed in the (x) step, such that the degree increase the higher the inclusion score.

(32) In the computer-readable recording medium according to (27) above, the (b) step involves deriving, as the extent of inclusion in the second text, a percentage at which the content of the homogeneous segment is described in the second text corresponding to the other first text which includes the homogeneous segment, further deriving a degree to which each segment constituting the first text which is set as the analysis target should be described in the second text corresponding to the first text which is set as the analysis target, such that the degree increases the higher the percentage, and performing the determination using the derived degree.

(33) In the computer-readable recording medium according to (27) above, the (b) step involves deriving, as the extent of inclusion in the second text, a frequency at which the content of the homogeneous segment is described in the second text corresponding to the other first text which includes the homogeneous segment, further deriving a degree to which each segment constituting the first text which is set as the analysis target should be described in the second text corresponding to the first text which is set as the analysis target, such that the degree increases the higher the frequency, and performing the determination using the derived degree.

(34) In the computer-readable recording medium according to (32) above, the (l) step, in addition to the specification of the homogeneous segment, involves computing a similarity score representing an extent of similarity between each of the plurality of segments constituting the first text which is set as the analysis target and the homogeneous segment, and the (b) step involves further deriving the degree such that the degree increases the higher the similarity score computed in the (l) step.

(35) In the computer-readable recording medium according to (25) above, the computer is further caused to execute the step of (c) segmenting the first texts based on at least one of a sentence, a paragraph, a topic and a phase included therein, and setting the plurality of segments.

(36) In the computer-readable recording medium according to (25) above, setting of the plurality of segments constituting the first texts is performed based on at least one of a sentence, a paragraph, a topic and a phase included in the first text.

INDUSTRIAL APPLICABILITY

The present invention is applicable in the case where a second text set exists in relation to a first text set. The present invention is particularly effective in the case where the second text set includes texts in which information that should originally be written therein is partially absent. Accordingly, the present invention is particular effective when the second text set is a text set that has been prepared manually. Given this, the present invention has industrial usability.

For example, there are cases where the first text set consists of speech recognition results of phone call speech in a call center or a transcribed text set of phone call speech, and the second text set is a set of customer memos. Also, the present invention is also effective for performing analysis in cases such as where the first text set consists of speech recognition results of meeting speech or a set of transcribed texts thereof, and the second text set is a set of the minutes of meetings.

Also, considering the case where two different people respectively make summaries of a given document set, the case where the summarized document set prepared by one person is the first text set and the summarized document set prepared by the other person is the second text set is also given as an example. Further, the present invention is also effective in the case where the first text set consists of research papers and the second text set is a set of abstracts of those research papers, or the case where the first text set consists of research papers and the second text set is material for presenting those research papers.

LIST OF REFERENCE NUMERALS

10 Input apparatus (Embodiment 1)
20 Output apparatus (Embodiment 1)
31 Homogeneous segment specification unit (Embodiment 1)
32 Inclusion determination unit (Embodiment 1)
33 Descriptive content determination unit (Embodiment 1)
34 Input reception unit (Embodiment 1)
110 Input apparatus (Embodiment 2)
120 Output apparatus (Embodiment 2)
131 Homogeneous segment specification unit (Embodiment 2)
132 Inclusion determination unit (Embodiment 2)
133 Descriptive content determination unit (Embodiment 2)
134 Input reception unit (Embodiment 2)
135 Text segmentation unit (Embodiment 2)
210 Input apparatus (Embodiment 3)
220 Output apparatus (Embodiment 3)
231 Homogeneous segment specification unit (Embodiment 3)
232 Inclusion determination unit (Embodiment 3)
233 Descriptive content determination unit (Embodiment 3)
234 Input reception unit (Embodiment 3)

The invention claimed is:

1. A text processing apparatus for performing an analysis process by contrasting a first text set constituted by first texts and a second text set constituted by second texts corresponding to the first texts, the first texts and the second texts corresponding thereto being generated around a same event through mutually different generation processes, the text processing apparatus comprising:
a segment determination unit; and
a descriptive content determination unit,
wherein the segment determination unit determines, with respect to a homogeneous segment that is similar to a plurality of segments constituting a first text which is set as an analysis target and that is included in another first text, whether a content thereof is included in the second texts, and
the descriptive content determination unit determines, based on a result of the determination by the segment determination unit, whether each segment constituting the first text which is set as the analysis target should be described in the second text corresponding to the first text which is set as the analysis target.

2. The text processing apparatus according to claim 1, wherein the segment determination unit includes a homogeneous segment specification unit and an inclusion determination unit,
the homogeneous segment specification unit, by contrasting each of the plurality of segments constituting the first text which is set as the analysis target and the other first text, specifies a segment similar to any of the plurality of segments constituting the first text which is set as the analysis target, from a plurality of segments constituting the other first text, and sets the specified segment as a homogeneous segment, and
the inclusion determination unit determines whether the content of the homogeneous segment is included in the second text corresponding to the other first text which includes the homogeneous segment.

3. The text processing apparatus according to claim 2, wherein the descriptive content determination unit derives, based on the result of the determination by the segment determination unit, an extent to which the content of the homogeneous segment is included in the second text corresponding to the other first text which includes the homogeneous segment, further derives, based on the derived extent, a degree to which each segment constituting the first text which is set as the analysis target should be described in the second text corresponding to the first text which is set as the analysis target, and performs the determination using the degree.

4. The text processing apparatus according to claim 3, wherein the inclusion determination unit, in addition to the determination regarding the content of the homogeneous segment, computes, for each of the plurality of segments constituting the first text which is set as the analysis target and for the homogeneous segment, an inclusion score representing a possibility of a content of the segment being included in the second text corresponding to the first text which includes the segment, and
the descriptive content determination unit further derives the degree using the inclusion score computed by the inclusion determination unit, such that the degree increase the higher the inclusion score.

5. The text processing apparatus according to claim 3, wherein the descriptive content determination unit derives, as the extent of inclusion in the second text, a percentage at which the content of the homogeneous segment is described in the second text corresponding to the other first text which includes the homogeneous segment, further derives a degree to which each segment constituting the first text which is set as the analysis target should be described in the second text corresponding to the first text which is set as the analysis target, such that the degree increases the higher the percentage, and performs the determination using the derived degree.

6. The text processing apparatus according to claim 5, wherein the homogeneous segment specification unit, in addition to the specification of the homogeneous segment, computes a similarity score representing an extent of similarity between each of the plurality of segments constituting the first text which is set as the analysis target and the homogeneous segment, and the descriptive content determination unit further derives the degree such that the degree increases the higher the similarity score computed by the homogeneous segment specification unit.

7. The text processing apparatus according to claim 3, wherein the descriptive content determination unit derives, as the extent of inclusion in the second text, a frequency at which the content of the homogeneous segment is described in the second text corresponding to the other first text which includes the homogeneous segment, further derives a degree to which each segment constituting the first text which is set as the analysis target should be described in the second text corresponding to the first text which is set as the analysis target, such that the degree increases the higher the frequency, and performs the determination using the derived degree.

8. The text processing apparatus according to claim 1, wherein the segment determination unit includes an inclusion determination unit and a homogeneous segment specification unit,
the inclusion determination unit determines, for the plurality of segments respectively constituting all of the first texts, whether a content of each segment is included in the second text corresponding to the first text which includes the segment, and
the homogeneous segment specification unit, by contrasting each of the plurality of segments constituting the first text which is set as the analysis target and a segment that is determined by the inclusion determination unit to be included in the second text and that is included in another first text, specifies a segment similar to any of the plurality of segments constituting the first text which is set as the analysis target, and sets the specified segment as a homogeneous segment.

9. The text processing apparatus according to claim 8, wherein the descriptive content determination unit derives, based on the result of the determination by the segment determination unit, an extent to which the content of the homogeneous segment is included in the second text corresponding to the other first text which includes the homogeneous segment, further derives, based on the derived extent, a degree to which each segment constituting the first text which is set as the analysis target should be described in the second text corresponding to the first text which is set as the analysis target, and performs the determination using the degree.

10. The text processing apparatus according to claim 9, wherein the inclusion determination unit, in addition to the determination regarding the content of each segment, computes, for the plurality of segments respectively constituting all of the first texts, an inclusion score representing a possibility of the content of each segment being included in the second text corresponding to the first text which includes the segment, and
the descriptive content determination unit further derives the degree using the inclusion score computed by the inclusion determination unit, such that the degree increase the higher the inclusion score.

11. The text processing apparatus according to claim 1, further comprising a text segmentation unit that segments the first texts based on at least one of a sentence, a paragraph, a topic and a phase included therein, and sets the plurality of segments.

12. The text processing apparatus according to claim 1, wherein setting of the plurality of segments constituting the first texts is performed based on at least one of a sentence, a paragraph, a topic and a phase included in the first text.

13. A text processing method for performing an analysis process by contrasting a first text set constituted by first texts and a second text set constituted by second texts corresponding to the first texts, with a computer, the first texts and the second texts corresponding thereto being generated around a same event through mutually different generation processes, the text processing method comprising the steps of:
(a) determining by the computer, with respect to a homogeneous segment that is similar to a plurality of segments constituting a first text which is set as an analysis target and that is included in another first text, whether a content thereof is included in the second texts; and
(b) determining by the computer, based on a result of the determination in the (a) step, whether each segment constituting the first text which is set as the analysis target should be described in the second text corresponding to the first text which is set as the analysis target.

14. The text processing method according to claim 13, wherein the (a) step includes the steps of:
(l) specifying, by contrasting each of the plurality of segments constituting the first text which is set as the analysis target and the other first text, a segment similar to any of the plurality of segments constituting the first text which is set as the analysis target, from a plurality of segments constituting the other first text, and setting the specified segment as a homogeneous segment, and
(m) determining whether the content of the homogeneous segment is included in the second text corresponding to the other first text which includes the homogeneous segment.

15. The text processing method according to claim 14, wherein the (b) step comprises deriving, based on the result of the determination in the (a) step, an extent to which the content of the homogeneous segment is included in the second text corresponding to the other first text which includes the homogeneous segment, further deriving, based on the derived extent, a degree to which each segment constituting the first text which is set as the analysis target should be described in the second text corresponding to the first text which is set as the analysis target, and performing the determination using the degree.

16. The text processing method according to claim 15, wherein the (m) step, in addition to the determination regarding the content of the homogeneous segment, comprises computing, for each of the plurality of segments constituting the first text which is set as the analysis target and for the homogeneous segment, an inclusion score representing a possibility of a content of the segment being included in the second text corresponding to the first text which includes the segment, and
the (b) step comprises further deriving the degree using the inclusion score computed in the (m) step, such that the degree increase the higher the inclusion score.

17. The text processing method according to claim 15, wherein the (b) step comprises deriving, as the extent of inclusion in the second text, a percentage at which the content of the homogeneous segment is described in the second text corresponding to the other first text which includes the homogeneous segment, further deriving a degree to which each segment constituting the first text which is set as the analysis target should be described in the second text corresponding to the first text which is set as the analysis target, such that the degree increases the higher the percentage, and performing the determination using the derived degree.

18. The text processing method according to claim 17,
wherein the (l) step, in addition to the specification of the homogeneous segment, comprises computing a similarity score representing an extent of similarity between each of the plurality of segments constituting the first text which is set as the analysis target and the homogeneous segment, and the (b) step comprises further deriving the degree such that the degree increases the higher the similarity score computed in the (l) step.

19. The text processing method according to claim 15,
wherein the (b) step comprises deriving, as the extent of inclusion in the second text, a frequency at which the content of the homogeneous segment is described in the second text corresponding to the other first text which includes the homogeneous segment, further deriving a degree to which each segment constituting the first text which is set as the analysis target should be described in the second text corresponding to the first text which is set as the analysis target, such that the degree increases the higher the frequency, and performing the determination using the derived degree.

20. The text processing method according to claim 13,
wherein the (a) step includes the steps of:
(x) determining, for the plurality of segments respectively constituting all of the first texts, whether a content of each segment is included in the second text corresponding to the first text which includes the segment, and
(y) specifying, by contrasting each of the plurality of segments constituting the first text which is set as the analysis target and a segment that is determined in the (x) step to be included in the second text and that is included in another first text, a segment similar to any of the plurality of segments constituting the first text which is set as the analysis target, and setting the specified segment as a homogeneous segment.

21. The text processing method according to claim 20,
wherein the (b) step comprises deriving, based on the result of the determination in the (a) step, an extent to which the content of the homogeneous segment is included in the second text corresponding to the other first text which includes the homogeneous segment, further deriving, based on the derived extent, a degree to which each segment constituting the first text which is set as the analysis target should be described in the second text corresponding to the first text which is set as the analysis target, and performing the determination using the degree.

22. The text processing method according to claim 21,
wherein the (x) step, in addition to the determination regarding the content of each segment, comprises computing, for the plurality of segments respectively constituting all of the first texts, an inclusion score representing a possibility of the content of each segment being included in the second text corresponding to the first text which includes the segment, and the (b) step further comprises deriving the degree using the inclusion score computed in the (x) step, such that the degree increase the higher the inclusion score.

23. The text processing method according to claim 13, further comprising the step of:
(c) segmenting the first texts based on at least one of a sentence, a paragraph, a topic and a phase included therein, and setting the plurality of segments, by the computer.

24. The text processing method according to claim 13,
setting of the plurality of segments constituting the first texts is performed based on at least one of a sentence, a paragraph, a topic and a phase included in the first text.

25. A non-transitory computer-readable recording medium having recorded thereon a program for causing a computer to execute an analysis process of contrasting a first text set constituted by first texts and a second text set constituted by second texts corresponding to the first texts, the first texts and the second texts corresponding thereto being generated around a same event through mutually different generation processes, the program recorded on the recording medium includes a command for causing the computer to execute the steps of:
(a) determining, with respect to a homogeneous segment that is similar to a plurality of segments constituting a first text which is set as an analysis target and that is included in another first text, whether a content thereof is included in the second texts; and
(b) determining, based on a result of the determination in the (a) step, whether each segment constituting the first text which is set as the analysis target should be described in the second text corresponding to the first text which is set as the analysis target.

26. The non-transitory computer-readable recording medium according to claim 25,
wherein the computer executes, as the (a) step, the steps of:
(l) specifying, by contrasting each of the plurality of segments constituting the first text which is set as the analysis target and the other first text, a segment similar to any of the plurality of segments constituting the first text which is set as the analysis target, from a plurality of segments constituting the other first text, and setting the specified segment as a homogeneous segment, and
(m) determining whether the content of the homogeneous segment is included in the second text corresponding to the other first text which includes the homogeneous segment.

27. The non-transitory computer-readable recording medium according to claim 26,
wherein the (b) step comprises deriving, based on the result of the determination in the (a) step, an extent to which the content of the homogeneous segment is included in the second text corresponding to the other first text which includes the homogeneous segment, further deriving, based on the derived extent, a degree to which each segment constituting the first text which is set as the analysis target should be described in the second text corresponding to the first text which is set as the analysis target, and performing the determination using the degree.

28. The non-transitory computer-readable recording medium according to claim 27,
wherein the (m) step, in addition to the determination regarding the content of the homogeneous segment, comprises computing, for each of the plurality of segments constituting the first text which is set as the analysis target and for the homogeneous segment, an inclusion score representing a possibility of a content of the segment being included in the second text corresponding to the first text which includes the segment, and the (b) step comprises further deriving the degree using the inclusion score computed in the (m) step, such that the degree increase the higher the inclusion score.

29. The non-transitory computer-readable recording medium according to claim 27,
wherein the (b) step comprises deriving, as the extent of inclusion in the second text, a percentage at which the content of the homogeneous segment is described in the second text corresponding to the other first text which includes the homogeneous segment, further deriving a degree to which each segment constituting the first text which is set as the analysis target should be described in the second text corresponding to the first text which is set as the analysis target, such that the degree increases the higher the percentage, and performing the determination using the derived degree.

30. The non-transitory computer-readable recording medium according to claim 29,
wherein the (l) step, in addition to the specification of the homogeneous segment, comprises computing a similarity score representing an extent of similarity between each of the plurality of segments constituting the first text which is set as the analysis target and the homogeneous segment, and
the (b) step comprises further deriving the degree such that the degree increases the higher the similarity score computed in the (l) step.

31. The non-transitory computer-readable recording medium according to claim 27,
wherein the (b) step comprises deriving, as the extent of inclusion in the second text, a frequency at which the content of the homogeneous segment is described in the second text corresponding to the other first text which includes the homogeneous segment, further deriving a degree to which each segment constituting the first text which is set as the analysis target should be described in the second text corresponding to the first text which is set as the analysis target, such that the degree increases the higher the frequency, and performing the determination using the derived degree.

32. The non-transitory computer-readable recording medium according to claim 25,
wherein the computer executes, as the (a) step, the steps of:
(x) determining, for the plurality of segments respectively constituting all of the first texts, whether a content of each segment is included in the second text corresponding to the first text which includes the segment, and
(y) specifying, by contrasting each of the plurality of segments constituting the first text which is set as the analysis target and a segment that is determined in the (x) step to be included in the second text and that is included in another first text, a segment similar to any of the plurality of segments constituting the first text which is set as the analysis target, and setting the specified segment as a homogeneous segment.

33. The non-transitory computer-readable recording medium according to claim 32,
wherein the (b) step comprises deriving, based on the result of the determination in the (a) step, an extent to which the content of the homogeneous segment is included in the second text corresponding to the other first text which includes the homogeneous segment, further deriving, based on the derived extent, a degree to which each segment constituting the first text which is set as the analysis target should be described in the second text corresponding to the first text which is set as the analysis target, and performing the determination using the degree.

34. The non-transitory computer-readable recording medium according to claim 33,
wherein the (x) step, in addition to the determination regarding the content of each segment, comprises computing, for the plurality of segments respectively constituting all of the first texts, an inclusion score representing a possibility of the content of each segment being included in the second text corresponding to the first text which includes the segment, and
the (b) step further comprises deriving the degree using the inclusion score computed in the (x) step, such that the degree increase the higher the inclusion score.

35. The non-transitory computer-readable recording medium according to claim 25, causing the computer to execute the step of:
(c) segmenting the first texts based on at least one of a sentence, a paragraph, a topic and a phase included therein, and setting the plurality of segments.

36. The non-transitory computer-readable recording medium according to claim 25,
setting of the plurality of segments constituting the first texts is performed based on at least one of a sentence, a paragraph, a topic and a phase included in the first text.

* * * * *